US009179232B2

(12) United States Patent
Jarske et al.

(10) Patent No.: US 9,179,232 B2
(45) Date of Patent: Nov. 3, 2015

(54) METHOD AND APPARATUS FOR ASSOCIATING AUDIO OBJECTS WITH CONTENT AND GEO-LOCATION

(71) Applicants: Petri Jarske, Tampere (FI); Juha Henrik Arrasvuori, Tampere (FI); Anssi Ramo, Tampere (FI); Adriana Vasilache, Tampere (FI); James Lynch, Espoo (FI)

(72) Inventors: Petri Jarske, Tampere (FI); Juha Henrik Arrasvuori, Tampere (FI); Anssi Ramo, Tampere (FI); Adriana Vasilache, Tampere (FI); James Lynch, Espoo (FI)

(73) Assignee: Nokia Technologies Oy, Espoo (FI)

( * ) Notice: Subject to any disclaimer, the term of this patent is extended or adjusted under 35 U.S.C. 154(b) by 409 days.

(21) Appl. No.: 13/621,523

(22) Filed: Sep. 17, 2012

(65) Prior Publication Data

US 2014/0079225 A1 Mar. 20, 2014

(51) Int. Cl.
*H04R 29/00* (2006.01)
*G09G 5/00* (2006.01)

(52) U.S. Cl.
CPC .................................. *H04R 29/00* (2013.01)

(58) Field of Classification Search
None
See application file for complete search history.

(56) References Cited

U.S. PATENT DOCUMENTS

| 6,446,001 | B1 | 9/2002 | Sakai et al. |
| 8,207,843 | B2* | 6/2012 | Huston .................... 340/539.13 |
| 2009/0023553 | A1 | 1/2009 | Shim |
| 2010/0302143 | A1 | 12/2010 | Spivack |
| 2013/0259447 | A1* | 10/2013 | Sathish et al. ................ 386/278 |
| 2013/0335446 | A1* | 12/2013 | Piippo et al. .................. 345/633 |

OTHER PUBLICATIONS

Notification of Transmittal of the International Search Report and The Written Opinion of The International Searching Authority, or The Declaration; International Search Report; Written Opinion for corresponding Application No. PCT/IB2013/058417, dated Jan. 17, 2014, 14 pages.

* cited by examiner

*Primary Examiner* — Regina N Holder
(74) *Attorney, Agent, or Firm* — Ditthavong & Steiner, P.C.

(57) ABSTRACT

An approach is provided for efficiently capturing, processing, presenting, and/or associating audio objects with content items and geo-locations. A processing platform may determine a viewpoint of a viewer of at least one content item associated with a geo-location. Further, the processing platform and/or a content provider may determine at least one audio object associated with the at least one content item, the geo-location, or a combination thereof. Furthermore, the processing platform may process the at least one audio object for rendering one or more elements of the at least one audio object based, at least in part, on the viewpoint.

20 Claims, 15 Drawing Sheets

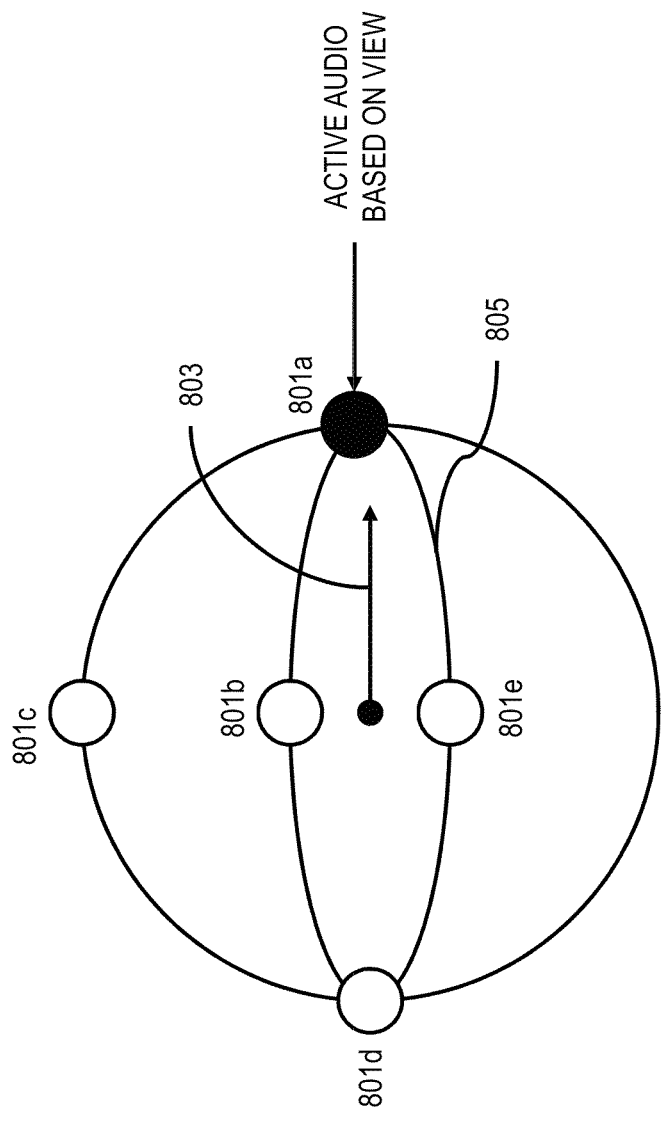

METHOD AND APPARATUS FOR ASSOCIATING AUDIO OBJECTS WITH CONTENT AND GEO-LOCATION

BACKGROUND

Service providers and device manufacturers (e.g., wireless, cellular, etc.) are continually challenged to deliver value and convenience to consumers by, for example, providing compelling network services. One area of interest has been in development of applications and services whereby consumers may utilize mapping application services for geo-location exploration services, which may allow a user to visualize and receive information about a location on a map displayed on a device (e.g., mobile device, a computer, etc.) Generally, mapping applications utilize still images originating from satellite imagery and/or still cameras mounted on vehicles driven through various geo-locations Accordingly, service providers and device manufacturers face significant technical challenges in providing applications for a better user experience.

SOME EXAMPLE EMBODIMENTS

Therefore, there is a need for an approach for efficiently capturing, processing, presenting, and/or associating audio objects with content items and geo-locations.

According to one embodiment, a method comprises determining a viewpoint of a viewer of at least one content item associated with a geo-location. The method also comprises determining at least one audio object associated with the at least one content item, the geo-location, or a combination thereof. Further, the method also comprises processing and/or facilitating a processing of the at least one audio object for rendering one or more elements of the at least one audio object based, at least in part, on the viewpoint.

According to another embodiment, an apparatus comprises at least one processor, and at least one memory including computer program code for one or more computer programs, the at least one memory and the computer program code configured to, with the at least one processor, cause, at least in part, the apparatus to determine a viewpoint of a viewer of at least one content item associated with a geo-location. The apparatus is further caused to determine at least one audio object associated with the at least one content item, the geo-location, or a combination thereof. Further, the apparatus is also caused to process and/or facilitate a processing of the at least one audio object for rendering one or more elements of the at least one audio object based, at least in part, on the viewpoint.

According to another embodiment, a computer-readable storage medium carrying one or more sequences of one or more instructions which, when executed by one or more processors, cause, at least in part, an apparatus to determine a viewpoint of a viewer of at least one content item associated with a geo-location. The apparatus is further caused to determine at least one audio object associated with the at least one content item, the geo-location, or a combination thereof. Further, the apparatus is also caused to process and/or facilitate a processing of the at least one audio object for rendering one or more elements of the at least one audio object based, at least in part, on the viewpoint.

According to another embodiment, an apparatus comprises means for determining a viewpoint of a viewer of at least one content item associated with a geo-location. The apparatus further comprises means for determining at least one audio object associated with the at least one content item, the geo-location, or a combination thereof. Further, the apparatus also comprises means for processing and/or facilitating a processing of the at least one audio object for rendering one or more elements of the at least one audio object based, at least in part, on the viewpoint.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A through 8D illustrate various configurations for rendering various content items in a 360 degree viewing configuration, according to various embodiments;

DESCRIPTION OF SOME EMBODIMENTS

Examples of a method, apparatus, and computer program for efficiently capturing, processing, presenting, and/or associating audio objects with content items and geo-locations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

The term "point of interest (POI)" and "geo-location" may be used interchangeably, according to some embodiments of the present invention, where a certain POI may be a certain object (e.g., a building, a water fountain, a bird, a train, etc.) at a certain geo-location and/or a geo-location may be a POI (e.g., an intersection at a given city, a street, an airport, a water fall, etc.)

Figure 1:
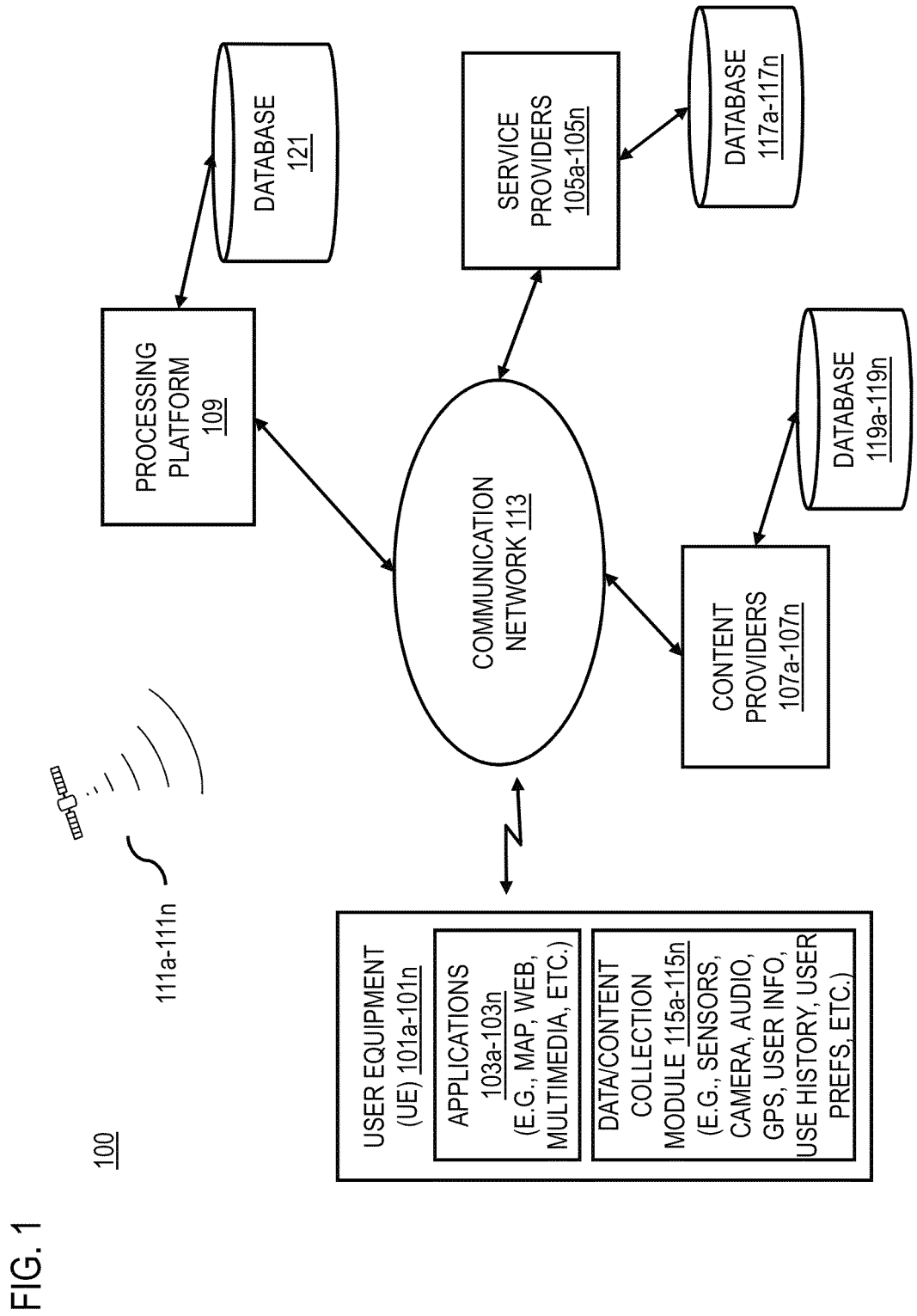
FIG. 1 is a diagram of a system capable of efficiently capturing, processing, presenting, and/or associating audio objects with content items and geo-locations, according to an embodiment.

FIG. 1 is a diagram of a system capable of efficiently capturing, processing, presenting, and/or associating audio objects with content items and geo-locations, according to an embodiment. As previously discussed, one area of interest has been development of services and technologies related to mapping applications whereby users may utilize various devices (e.g., mobile phones, tablets, computers, etc.) and applications (e.g., maps, multimedia, etc.) for receiving and/or viewing content items (e.g., video, audio, images, text, information, etc.) associated with a geo-location. Further, with advancements in the services and the technologies, users are able to utilize various services and applications to explore geo-locations of interest, for example, to view images of a given point of interest ((POI), e.g., a city center, an historic site, a concert hall, a resort, a shopping mall, a geo-location address, etc.) Still, aural characteristics (e.g., audio recordings/objects) associated with the POI may allow for a more complete user experience and a true sense of the POI. For example, ambient audio samples associated with a content item (e.g., an image of a fountain at a given geo-location, an image of a certain train station or airport, image of a bird in the content item, etc.) may be presented as a summary or individual renderings. However, in addition to considerations for any privacy, security, copyright, etc. issues, it may not be economically feasible to capture and/or add videos and/or long audio recordings (e.g., large data storage) to all content items represented in an application, for example, images/objects in a map.

To address at least these problems, a system 100 of FIG. 1 introduces the capability for efficiently capturing, processing, presenting, and/or associating audio objects with content items and geo-locations. In general, a given geo-location may be characterized by sights, sounds, smells, and other sensory information, which may be different and/or similar to such characteristics of other geo-locations. Further, a given geo-location may include various POIs where each POI may be associated with an aural characteristic; for example, a certain bell tower with ringing bells, a water fountain at a city park, sound of pedestrian traffic near a train station during a rush hour, and the like. Typically, users may utilize various applications to search for and/or consume content items (e.g., multimedia, information, etc.) associated with the various POIs, for example, to see an image of the bell tower, an image of the fountain, an image of the pedestrian traffic, and the like, where the images may be presented via various applications (e.g., a mapping application, multimedia player, etc.). However, to have an impression of a related sound environment, users/viewers may wish to receive and consume audio objects (e.g., audio samples) along with the images for a richer user experience/feel of a given geo-location (e.g., indoors/outdoors). In various embodiments, a service provider and/or an application may aggregate various audio objects associated with a POI, where the audio objects may have been collected by one or more service providers and/or by one or more users (e.g., crowd-sourcing).

In various embodiments, the audio objects may be based on various lengths of (a few seconds, for example) recordings of ambient sound at a certain geo-location, where various segments/elements of the audio objects may be processed and analyzed in order to determine any modifications that may be required in order to protect privacy (e.g., not to recognize complete sentences of speech) and/or copyright (e.g., significant pieces of music). Furthermore, one or more elements of the audio objects may be selected and rendered for providing different spatial sound effects (e.g., surround, stereo, etc.), which may be based on relative location of a viewer to an object, a viewing direction, a viewing angle, other nearby content items, and the like. In one embodiment, where multiple content items and audio objects are in a viewing area, the viewer may select and/or modify the content items and/or the audio objects. For example, there may be various content items in an image/map—a plane, a train, a water fountain, and birds, where a viewer may select to keep one or more of the content items in the viewing area and may select one or more audio objects and/or one or more elements of the one or more audio objects for rendering one or more audio objects, for example, according to one or more sound effects determined by the viewer, one or more applications, one or more content providers, and/or one or more service providers.

In various embodiments, when content items (e.g., image, video, information, GPS markers, etc.) for a given geo-location (e.g., a street view), POI, physical object, environment, etc. are generated, one or more audio objects (e.g., a short sound clip of a few seconds), including ambient sound, may be captured at the same time, before, and/or after the content items (e.g., images) are generated. Further, the one or more audio objects may be associated with the content items so that a user consuming a content item (e.g., an image of a certain street scene) may be presented with one or more randomized segments of the one or more audio objects such that the user (e.g., a viewer/listener) may form an impression of sound ambience associated with the content item, i.e., the audio object sounds like the street scene in the content item. In one embodiment, one or more elements of the one or more audio objects are presented/rendered based on relative positions (e.g., virtual positions) of one or more POIs, physical objects, persons, and the like to a current position selected by the user/viewer (e.g., virtual position on a map). For example, a viewer is utilizing a mapping application to view one or more POIs from a certain perspective in the mapping application, wherein the perspective may be controlled by the viewer and/or an application. In one embodiment, the one or more elements are utilized to add one or more sound effects (e.g., a three dimensional (3D) sound effect, stereo, etc.) to the rendered audio object. In various embodiments, multiple audio objects in an audible distance from the user position (e.g., in a virtual map) may be aggregated, wherein a user and/or one or more applications may control one or more elements of one or more audio objects, for example, based on user movement, orientation, objects in view, and the like.

In one embodiment, the audio objects associated with different physical/virtual objects may be isolated from each other so that a user and/or an application may independently select and/or manipulate (e.g., loop, change effects, randomize, etc.) each audio object and/or one or more elements of each audio object. For example, a user and/or an application may customize ambient sounds associated with content items according to various conditions and desires.

In one embodiment, the content items (e.g., street view images) may be analyzed for determining exact positions of the audio objects' sources (e.g. people talking with their mouths open, birds twittering, cars passing by, fountains bubbling, etc.), wherein the positions of the audio objects' sources depend on the user's current vantage point in the street view. For example, when the user zooms out the image, the audio objects are grouped closer (e.g., overlapped) as they appear to be close to each other in the zoomed-out image.

In various embodiments, the content items (e.g., street view images) may be analyzed for determining/detecting various possible audio object sources associated with various POIs, physical/virtual objects, geo-locations (e.g., indoors, outdoors, museums, shopping malls, concert halls, etc.), wherein various audio objects for various detected sources (e.g., cars, planes, trains, fountains, pedestrian traffic, birds, parks, waterfalls, rain, etc.) may be obtained from an audio database (e.g., a content provider). In one embodiment, synthesized (e.g., electronically produced) audio objects may be used to enhance, augment, modify, etc. an audio object; for example, to improve its quality (i.e. an original audio recording may be noisy), or add one or more elements for a higher quality to allow better 3D audio rendering. In various examples, an audio object source (e.g. a fountain, a car, a bird, etc.) may be first determined from an original audio recording, wherein further matching/similar audio objects are obtained through audio/sound synthesis. Further, the synthesized audio objects may be used to extend an original short recording, for example, by crossfading between the original recording and the synthesized version. In one embodiment, if an audio object contains intelligible audible speech (e.g., people talking), a synthesized audio object may be utilized to mask the intelligible portions of the audio object and render the audio object as a generic chatter of a crowd (e.g., a sound effect imitating the murmur of a crowd in the background).

In one embodiment, an audio object may be utilized to search for one or more geo-locations and/or physical/virtual objects associated with the same/similar audio object (e.g., similar sounding objects/places).

In one embodiment, one or more audio objects may be utilized for association with various virtual geo-locations in various applications (e.g., a mapping application) and provide related audio ambience, for example, the audio objects may include metadata indicative of original recording geo-locations (e.g., geo-tagged).

In one embodiment, the system 100 determines a viewpoint of a viewer of at least one content item associated with a geo-location. In one embodiment, a processing platform determines a viewers'/user's perspective (e.g., virtual location, viewing angle, etc.), with reference to a geo-location, when the user is viewing a content item in the application, for example, via data from global positioning system (GPS), compass, gyroscope, and the like associated with a user device. In one use case, a user may utilize a mapping application on a device (e.g., a tablet) to view one or more content items (e.g., images, drawings, map objects, etc.) presented via the mapping application and/or overlaid onto the mapping application (e.g., media items included in a presentation of a map), wherein the content items may be renderings of various two dimensional (2D), 3D, augmented reality (AR), virtual reality (VR), and the like representations and/or images of objects (e.g., buildings, people, cars, birds, motorcycles, etc.) associated with a given geo-location (e.g., a city center). In various embodiments, the viewpoint may be determined by an application, may be selected by a user, by a service provider, and the like. For example, a user may utilize a user interface (UI) to select a viewpoint in a map which may indicate a virtual geo-location in the map (e.g., the viewer standing at a corner of an intersection at a given city center). In one embodiment, the viewpoint may be determined from current and/or previous location information associated with a user, for example, GPS information in a user device. In one embodiment, the one or more content items may be captured and/or provided by an application, a user, a content provider, a service provider, or a combination thereof, for example, based on location information by the user.

In one embodiment, the system 100 determines at least one audio object associated with the at least one content item, the geo-location, or a combination thereof. In various embodiments, an application, a service provider, a content provider, a user, and the like may provide, retrieve, and/or capture one or more audio objects for association with the a content item, an object, a geo-location, and the like. In one instance, a service provider may determine, from a content item (e.g., a picture), the geo-location information of a POI (e.g., a certain city park) that is being viewed by a user via an application (e.g., a mapping application) and may provide/cause a retrieval of one or more audio objects associated with the POI and/or the surrounding area within an audible distance. For example, the geo-location of the POI may be associated with audio objects including sounds from a nearby water fountain, a bird sanctuary, pedestrian traffic, and the like. In one embodiment, the user may provide the one or more audio objects (e.g., from a personal recording, from a storage device, etc.)

In one embodiment, the system 100 processes the at least one audio object for rendering one or more elements of the at least one audio object based, at least in part, on the viewpoint. In one embodiment, a processing platform (e.g., via a service provider, a content provider, a user device, etc.) may process the one or more audio objects for determining one or more elements of the one or more audio objects based on the viewpoint of the viewer. In one instance, an audio object may include various elements that may be utilized to render various renditions, for example, in high definition (HD), in stereo, directional, and the like based on the viewer's viewpoint, the audio parameters (e.g., viewer selection, device capability, etc.), the viewer distance to a sound source (e.g., virtual distance in a mapping application), and the like.

In one embodiment, the at least one audio object is captured substantially simultaneously, at a same geo-location, or a combination thereof as the at least one content item. In various embodiments, the one or more audio objects may be captured/recorded by a user and/or a service provider at a same time and/or at a same location as the one or more content items. For example, a user and/or a service provider may capture an image (or a video) of a POI at a certain geo-location, wherein one or more audio objects (e.g., sound recordings) may also be captured at the same time and same location. In one embodiment, the one or more audio objects may be captured before and/or after a content item is captured, for example, to provide sound around the time the content item was captured.

In one embodiment, the system 100 processes the at least one audio object for manipulating the one or more elements of the at least one audio object. In one embodiment, a processing platform may process and/or manipulate the one or more audio objects and/or their one or more elements. In one instance, an audio object may have various elements for HD sounds, stereo, music, speech, nature sounds, and the like, wherein various applications, user preferences, device capabilities, and the like may require and/or suggest manipulation of the elements of the audio objects. For example, a user may wish to amplify, fadeout, mix, etc. certain elements of an audio object for different effects, for clarity, different experience, and the like. In one embodiment, one or more audio objects and/or one or more elements of the one or more audio objects may be presented in a loopback mode (e.g., for continues playing).

In one embodiment, the system 100 processes the at least one content item for determining at least one physical object, at least one audio source associated with the at least one audio object, metadata associated with the at least one content item, or a combination thereof. In various embodiments, a processing platform may utilize one or more algorithms, processes, applications, etc. to process one or more content items (e.g., an image, a video segment, etc.) for determining one or more physical objects (e.g., a car, a statue, a person, a dog, a street sign, etc.), one or more potential audio sources (e.g., a dog, a car, a bird, a person, rain, etc.), metadata associated with the one or more content items (e.g., location information, a POI, date, time, etc.), and the like. For example, a content item may include one or more images of one or more objects/things, which may be detected/recognized by utilizing one or more applications (e.g., image detection, face detection, object detection, etc.)

In one embodiment, the system 100 determines one or more other audio objects based, at least in part, on the at least one physical object, the at least one audio source, the metadata, or a combination thereof. In one embodiment, a processing platform, a content provider, and the like may retrieve, request, and/or provide one or more audio objects which may be associated with the at least one physical object, for example, sounds near a building, in a shopping mall, at a POI, etc. In one embodiment, the one or more audio objects may be associated with one or more audio sources, for example, a car, sirens on an ambulance, a motorcycle, people, birds, pedestrian traffic, etc. Further, the one or more audio objects may be determined from metadata associated with a content item, for example, a given shopping district at a given time of day during a shopping day, a certain seaside café (e.g., sounds of seagulls, boats, waves, music, etc.)

In one embodiment, the system 100 causes, at least in part, a synthesis of one or more segments of the at least one audio object, the one or more elements, or a combination thereof. In one embodiment, one or more segments of one or more audio object and/or one or more elements may be synthesized (e.g., electronically produced), which may be based on one or more available audio objects and/or elements, one or more audio sources, one or more content items, one or more geo-locations, one or more POIs, and the like. For example, a content item includes an image of a motorcycle speeding through a street with tall buildings, wherein a synthesizer on a device, at a content provider, and the like may synthesize sound of a motorcycle substantially close to possible sounds (e.g., exhaust, engine, wheels, etc.) for the motorcycle recognized in the image (e.g., type, model, etc.) with possible effects/elements due to the pavement, echo from nearby buildings, and the like.

In one embodiment, the system 100 determines one or more privacy policies, one or more security policies, one or more viewer preferences, or a combination thereof associated with the at least one content item, the at least one audio object, or a combination thereof. In various embodiments, a processing platform, a content provider, an application, and the like may determine one or more privacy policies, security policies, user preferences, and the like which may be associated with a content item and/or an audio object. For example, an image may depict a person speaking (e.g., facial expression/gestures, open mouth, etc.) at an audible distance (e.g., 3 feet away, privacy/security consideration). In one example, an image depicts a concert hall, a music store, and the like, where copyright content may be present (e.g., music playing). In one embodiment, a device may include viewer preferences and/or the viewer may utilize a UI to indicate certain preferences associated with a content item and/or an audio object (e.g., associated with the content item). In various embodiments, processing/analysis of one or more elements of one or more audio objects (e.g., audio analysis) may indicate one or more privacy/security policies (e.g., intelligible speech, music, etc.), potential user preferences (e.g., for noisy audio objects, for too many overlapping audio objects/elements, for music, etc.)

In one embodiment, the system 100 causes, at least in part, a recomposition of the at least one audio object based, at least in part, on the one or more privacy policies, the one or more security policies, the one or more viewer preferences, or a combination thereof. In various embodiments, a processing platform, a content provider, and the like, may recompose one or more audio objects and/or one or more elements based on the one or more privacy/security policies, viewer preferences, device capabilities, and the like. For example, an audio object and/or its elements may be recomposed (e.g., altered, manipulated, etc.) so that an intelligible speech becomes substantially un-intelligible (e.g., considering privacy issues), a music recording becomes very short (e.g., considering copyright issues). In one example, one or more audio objects and their elements are recomposed according to viewer preferences; for example, by including, excluding, changing direction, adding special effects, and the like to the one or more audio objects and/or to their elements.

In one embodiment, the system 100 determines one or more points of interest associated with the at least one content item, the geo-location, or a combination thereof. In one embodiment, one or more POIs (e.g., a shopping mall, a restaurant, a coffee shop, a food mart, a museum, etc.) may be determined, for example, from a content item (e.g., an image of a city center), from geo-location information associated with a content item and/or a user (e.g., device), metadata associated with a content item, and/or an audio object.

In one embodiment, the system 100 causes, at least in part, a rendering of one or more aural messages associated with the one or more points of interest, the geo-location, or a combination thereof. In one embodiment, a content provider, a service provider, and the like may present one or more audio objects, which include one or more aural messages (e.g., sales/products/services information, coupons, advertisement, etc.) associated with one or more POIs (e.g., a coffee shop, a shopping mall, a restaurant, etc.) For example, the audio objects may include information based on the location, user preferences, time of day, day of week, and the like.

In one embodiment, the system 100 processes the at least one audio object for determining at least one physical object, at least one geo-location, at least one point of interest, or a combination thereof associated with the at least one audio object. In one embodiment, a processing platform may analyze one or more audio objects and/or their elements for determining a physical object (e.g., a car, an audio source) that may be associated with the one or more audio objects and/or their elements. In one embodiment, the processing platform may also determine one or more geo-locations and/or POIs associated with the one or more audio objects and/or their elements. For example, one or more audio objects may be associated with a certain shopping mall (e.g., indoor, outdoor), wherein the audio objects may be associated with different times of a day, days of a week, at a particular distance from an audio source, and/or may be various audio objects collected by various users and/or content/service providers. In one instance, multiple users may have collected audio objects (e.g., sound recordings), which may be aggregated by one or more content/service providers. In one example, an audio object may be associated with a particular POI at a particular geo-location (e.g., Eiffel Tower, Paris), or a particular POI (e.g., a seaside marina) available at various geo-locations, and the like.

In one embodiment, the system 100 causes, at least in part, a presentation of a user interface for determining one or more user interactions. In various embodiments, a UI application with various elements may be presented to a user/viewer whereby the user may indicate various user preferences, for example, in viewing content items and/or in consuming one or more audio objects and their elements.

In one embodiment, the system 100 causes, at least in part, at least one modification to the at least one audio object based, at least in part, on the one or more user interactions. In one various embodiments, a user may select different vantage points (e.g., different angles, different positions) for viewing various content items in a map view and/or for hearing various associated audio objects and their elements under different conditions (e.g., daytime, night time, rush hour, lunch time, weekends, etc.) and/or with certain effects (e.g., stereo, loop, fadeout, aural messages, etc.)

In one embodiment, the system 100 cause, at least in part, a capturing of the one or more elements of the at least one audio object via a plurality of devices. In various embodiments, one or more devices (e.g., capable of recording audio, multimedia, etc.) may be utilized for capturing one or more audio objects and/or one or more elements of one or more audio objects. For example, a user and/or a service provider may utilize one or more devices with one or more microphones (e.g., directional, at different orientations, with different sensitivities, etc.) for recording various sound recordings, wherein each device and/or element may record various audio objects and/or elements. In one embodiment, a plurality of microphones may be on one device (e.g., with spatial separation), for example, a mobile phone, a car, a camera, etc.

In one embodiment, the system 100 cause, at least in part, an aggregation of the one or more elements for rendering one or more variations of the at least one audio object. In various embodiments, a plurality of audio objects and/or elements may be aggregated and rendered as one or more audio objects and/or one or more elements of one or more audio objects, wherein the aggregation may be performed by a user device, by a content/service provider, and the like. In one embodiment, one or more elements of one or more audio objects may be aggregated to render one or more different audio objects than originally intended for.

As discussed above, the system 100 may provide various benefits and advantages to the users utilizing the methods of the system 100. For example, the system 100, at least, provides an efficient mechanism for capturing, associating, and consuming audio objects related to contents and geo-locations. Further, the system 100 provides easy but yet efficient methods for users to request, receive, and consume additional content items (e.g., audio objects, aural messages, etc.) via different applications on a device while requesting, receiving, and consuming other types of content items (e.g., images, map data, location based content, etc.) Example benefits of the system 100 include differentiation in applications (e.g., maps, multimedia, etc.) and services which may utilize the methods of the system 100 by adding sound ambience to other contents (e.g., images) at different geo-locations, POIs, indoors, outdoors, and to various maps of the same locations. Further, the system 100 would allow users to explore and discover locations through how they sound. Additionally, storage requirements for adding the audio objects are relatively small compared to visual content items. Furthermore, privacy, security, and rights management issues would be resolved as the sound played is in short segments, wherein original speech sentences and/or music may not be reconstructed. Moreover, a user may search for similarly sounding locations by utilizing the audio objects with or without information of other content items (e.g., images).

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, multimedia applications, user interface (UI), map application, web client, etc. to communicate with other UEs 101, one or more service providers 105a-105n (also collectively referred to as service providers 105), one or more content providers 107a-107n (also collectively referred to as content providers 107), a processing platform 109, one or more GPS satellites 111a-111n (also collectively referred to as GPS satellites 111), and/or with other components of the system 100 directly and/or via communication network 113. In one embodiment, the UEs 101 may include data/content collection modules 115a-115n (also collectively referred to as DC collection module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 111 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the service providers 105 may include and/or have access to one or more database 117a-117n (also collectively referred to as database 117), which may include various user information, user profiles, user preferences, one or more profiles of one or more user devices (e.g., device configuration, sensors information, etc.), service providers 105 information, other service providers' information, and the like.

In one embodiment, the content providers 107 may include and/or have access to one or more database 119a-119n (also collectively referred to as database 119), which may store, include, and/or have access to various content items. For example, the content providers 107 may store content items (e.g., at the database 119) provided by various users, various service providers, crowd-sourced content, and the like. In various embodiments, the content providers 107 may sort, manage, store, and/or make the content items available based on various parameters, for example, geo-location information (e.g., of a submitter, of a content item, of a requestor, of a POI, etc.), sequential order, content type (e.g., audio, video, still images, etc.), date/time of content creation and/or submission, date/time of a content request, and the like. In various embodiments, the content may include media items, maps, metadata (e.g., geo-location information, content type, content creator, etc.) associated with the content items, various POIs, and the like.

In one embodiment, the processing platform 109 may include and/or have access to a database 121 to access and/or store information associated with the users, content, UEs 101, media, media recognition models, and the like. In one embodiment, the service providers 105 may obtain content (e.g., media content, POI information, etc.) from the content providers 107 and then offer the content to the UE 101, to the processing platform 109, and/or to one or more other services or entities of the system 100. It is noted that the processing platform 109 may be a stand-alone entity in the system 100, a part of the service providers 105, a part of the content providers 107, included within the UE 101 (e.g., as part of the applications 103), or a combination thereof. In various embodiments, the processing platform 109 may include one or more software, hardware, firmware, algorithms, and the like modules for processing content items, for example, audio, video, images, text, etc. In one embodiment, the processing platform 109 may process, analyze, detect, aggregate, and the like, audio objects (e.g., sound recordings) and elements of the audio objects, for example, for rendering various audio objects, fine tune, manipulate, synthesize, create ambient soundtracks, synchronize, improvise, add sound-effects, and the like. In one embodiment, the processing platform 109 may process metadata associated with a content item for determining information associated with the content item, for example, geo-location, sound source, user information, user preferences, user device capabilities, audio characteristics, and the like. In various embodiments, the processing platform 109 may include sound editing functions include cut, copy, paste, delete, insert, silence, auto-trim, and the like. Further, audio effects including amplify, normalize, equalizer, envelope, reverb, echo, reverse, etc. Furthermore, capabilities include support for audio and music file formats including mp3, way, wma, au, aac, m4a, mid, and the like. Additionally, tools and applications to apply effects and/or convert multiple audio objects into fewer audio objects, search and bookmark audio for editing and aggregating, (e.g., create bookmarks and index by POIs, geo-locations, regions, and the like to easily find, recall and assemble element of longer audio files/recordings. The tools may also include spectral analysis (FFT), speech synthesis (text-to-speech), noise reduction, sampling rate, and the like.

In one embodiment, the service providers 105 may include one or more service providers offering one or more services, for example, online shopping, social networking services (e.g., blogging), media upload, media download, media streaming, account management services, or a combination thereof. Further, the service providers 105 may conduct a search for content items, media items, information, coupons, and the like associated with one or more users, POIs, geo-locations, and the like. In certain embodiments, the processing platform 109 is implemented as a collection of one or more hardware, software, algorithms, firmware, or combinations thereof that can be integrated for use with the service providers 105 and/or with the content providers 107. In various embodiments, the processing platform 109 can be maintained on a network server, while operating in connection with the service providers 105 and/or with the content providers 107 as an extensible feature, a web-service, an applet, a script, an object-oriented application, or the like to enable processing, analyzing, detecting, and the like, of content items (e.g., audio, video, image, text, etc.), metadata, and the like. Further, the processing platform 109, the service providers 105, and/or the content providers 107 may utilize one or more service application programming interfaces (APIs)/integrated interface, through which communication, media, content, and information (e.g., associated with users and services, content, POIs, etc.) may be shared, accessed and/or processed.

By way of example, the UEs 101, the service providers 105, the content providers 107, and the processing platform 109 may communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101 and the processing platform 109 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
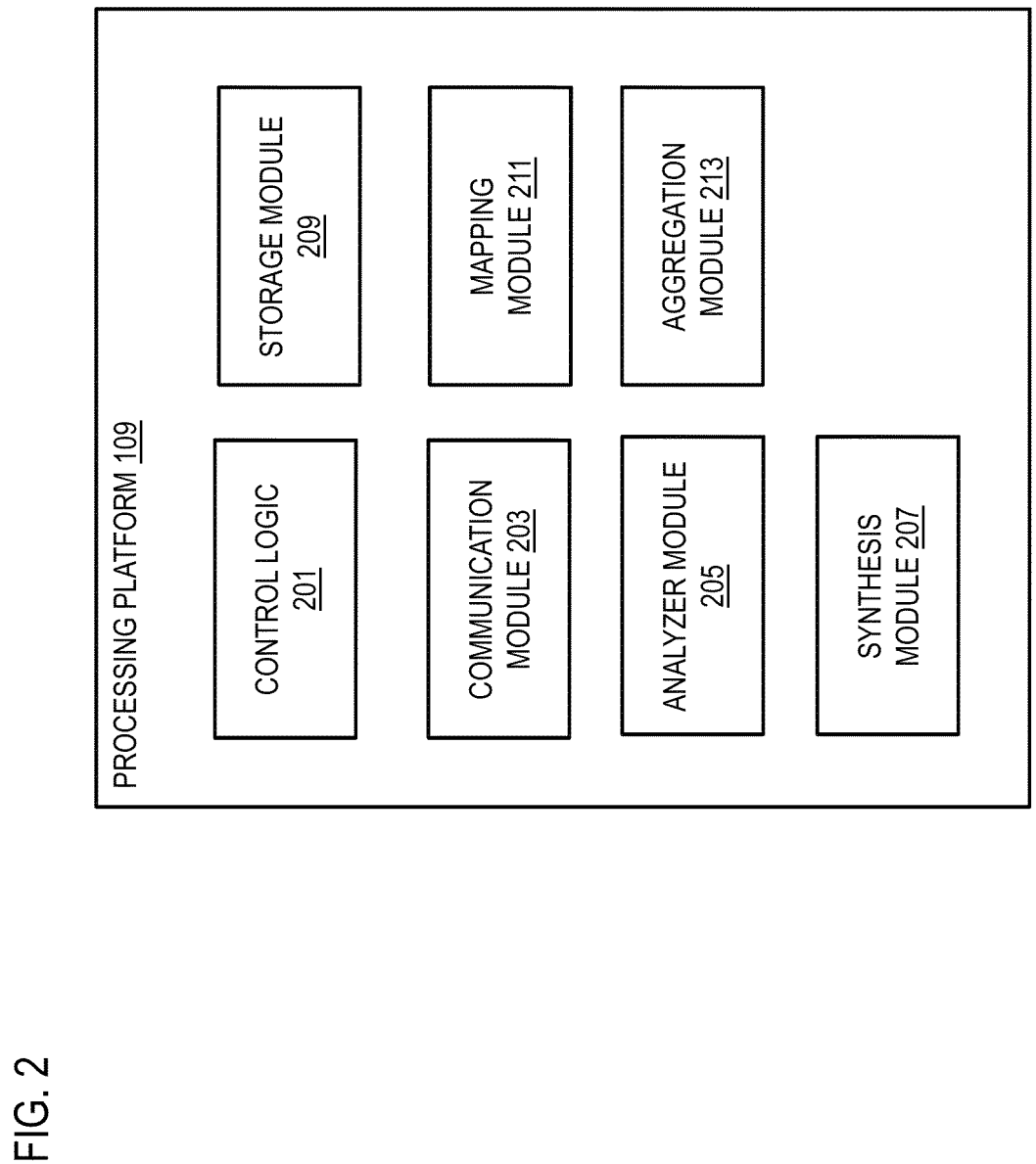
FIG. 2 is a diagram of the components of an audio and content processing platform, according to an embodiment.

FIG. 2 is a diagram of the components of a processing platform 109, according to an embodiment. By way of example, the media processing platform 109 includes one or more components for content processing services. It is contemplated that the functions of these components may be combined in one or more components or performed by other components of equivalent functionality. In this embodiment, the processing platform 109 includes a control logic 201, a communication module 203, an analyzer module 205, a synthesis module 207, a storage module 209, a mapping module 211 and an aggregation module 213.

The control logic 201 oversees tasks, including tasks performed by the communication module 203, the analyzer module 205, the synthesis module 207, and the storage module 209. For example, although other modules may perform the actual task, the control logic 201 may determine when and how those tasks are performed or otherwise direct the other modules to perform the tasks.

The communication module 203 is used for communication between the UEs 101, the service providers 105, the content providers 107, and other entities of the system 100. The communication module 203 may also be used to render the content items (e.g., audio objects, images, mapping elements, etc.) The content items may be rendered in connection with a mapping module 211, which accesses data for representing location of the various content items to a map. The communication module 203, in connection with the storage module 209 also may be used to cause one or more associations of the stored, shared, or a combination thereof content items (e.g., audio objects). As such, various content items may be rendered to a user via the applications 103 for selection, review, or addition to a library. The communication module 203 may also be used, in connection with the analyzer module 205, to retrieve content items in response to a search command based on geo-location coordinates determined by the analyzer module 205, by a service provider, from metadata associated with a content item, and the like.

The analyzer module 205 may be used to determine the GPS coordinates of the location within a mapping application associated with a content item. In addition, the analyzer module 205 may interpret search commands for specific content item (e.g., location search, audio search, POI search, etc.)

Still further, the analyzer module 205 may analyze an audio object for determining associated possible sound source, geo-location, object, POI.

The synthesis module 207 is used to mix, match, create, amend, loop, and the like audio objects and/or associated elements for composition/recomposition purposes. The synthesis module 207 may also operate in connection with the applications 103 (e.g., media player) to enable generation of playlists. In certain embodiments, the synthesis module 207 operates in connection with the communication module 203 to enable retrieval of commercial media compositions and composed media selections to be displayed to users via the applications 103. It is contemplated that the synthesis module 207 may mix the media items based, at least in part, on one or more time scale modification, one or more beat matching, one or more tempo matching, one or more rhythm matching, or a combination thereof processes. By way of example, the synthesis module 207, in connection with the synthesis module 207, may mix the media items based on beat and downbeat analysis methods such that the drum loop is (1) time-stretched to make the drum loop tempo match the tempo of the active first media item and (2) the first beat of each measure of the drum loop is matched to the downbeats of the first media item.

The storage module 209 is used to manage the storage of the one or more stored, shared, or a combination thereof content items (e.g., audio objects, images, mapping elements, etc.) associated and/or stored on the UEs 101, at the database 121, or at various elements of the system 100, for example, content items at the content providers 107, at a mapping database, and the like.

The mapping module 211 may utilize metadata associated with an audio object and/or content items to determine location information associated with the audio object and/or the content items for indicating their location in a mapping application. Further, the location information may be utilized and/or communicated to other applications and/or to other entities of the system 100 so the audio objects and the content items may be presented to a user via a mapping and/or other applications on a device. In one embodiment, the mapping module 211 may also utilize location information of audio objects and other content items (e.g., an image) for associating the audio objects and other content items together, wherein the association information may be stored and/or shared with other applications and/or entities of the system 100.

The aggregation module 213 the analyzer module 205 may utilize one or more applications and/or algorithms for aggregating (e.g., integrating, combining, etc.) a plurality of audio objects and/or a plurality of elements of the audio objects for providing a plurality of aggregated audio objects, where the aggregated audio objects may include various audio objects and/or elements of the audio objects. For example, a plurality of the audio objects and their elements may be combined into different versions of audio objects with different effects, which may be according to one or more user preferences, content/service provider criteria, and the like. In one embodiment, the aggregation module 213 may facilitate an application user interface (API) for facilitating execution of one or more applications and/or algorithms via one or more content/service providers, one or more other entities (e.g., third party) of the system 100, and the like.

Figure 3:
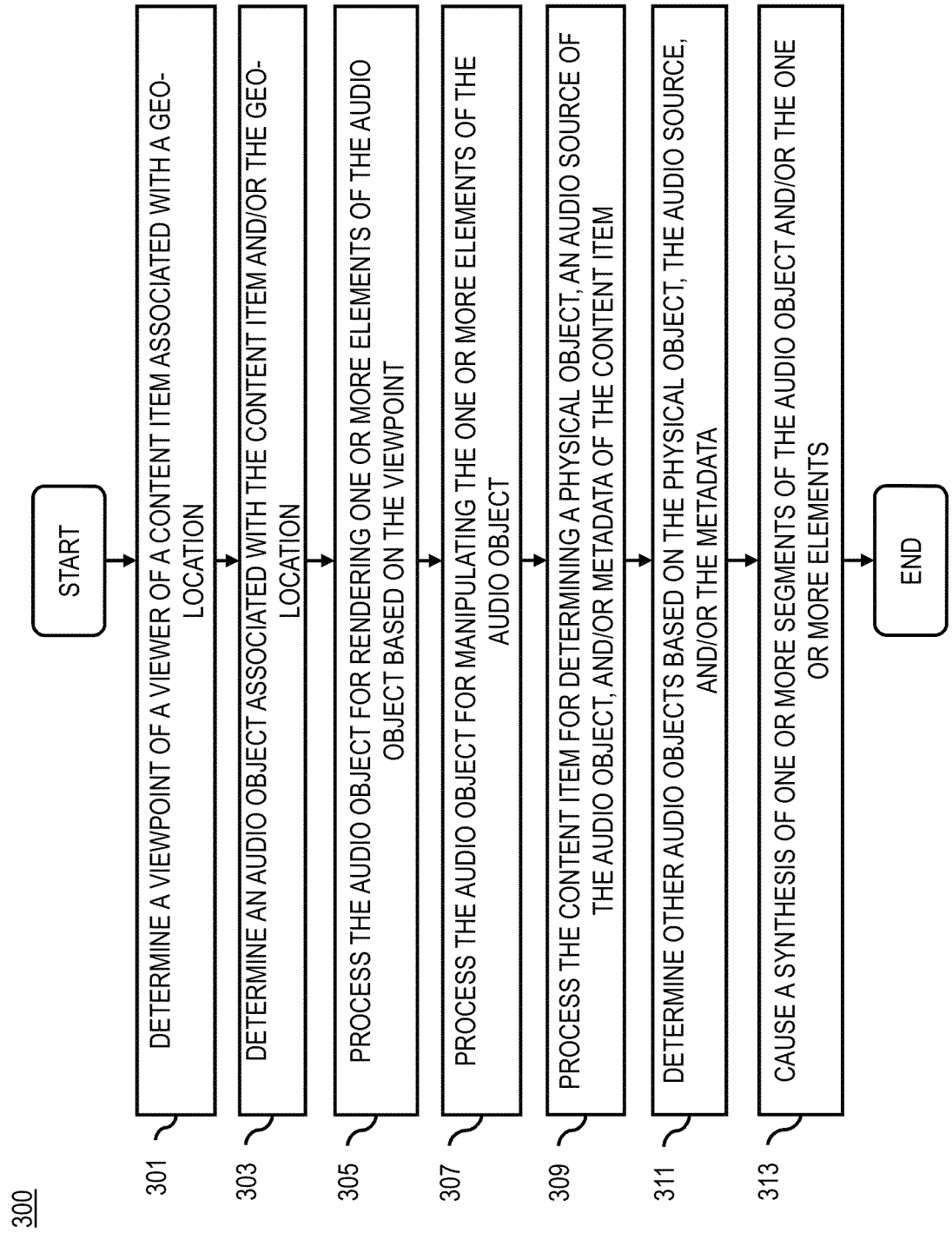
FIGS. 3 through 5 are flowcharts of processes for, at least, capturing, processing, presenting, and/or associating audio objects with content items and geo-locations, according to various embodiments.
Figure 9:
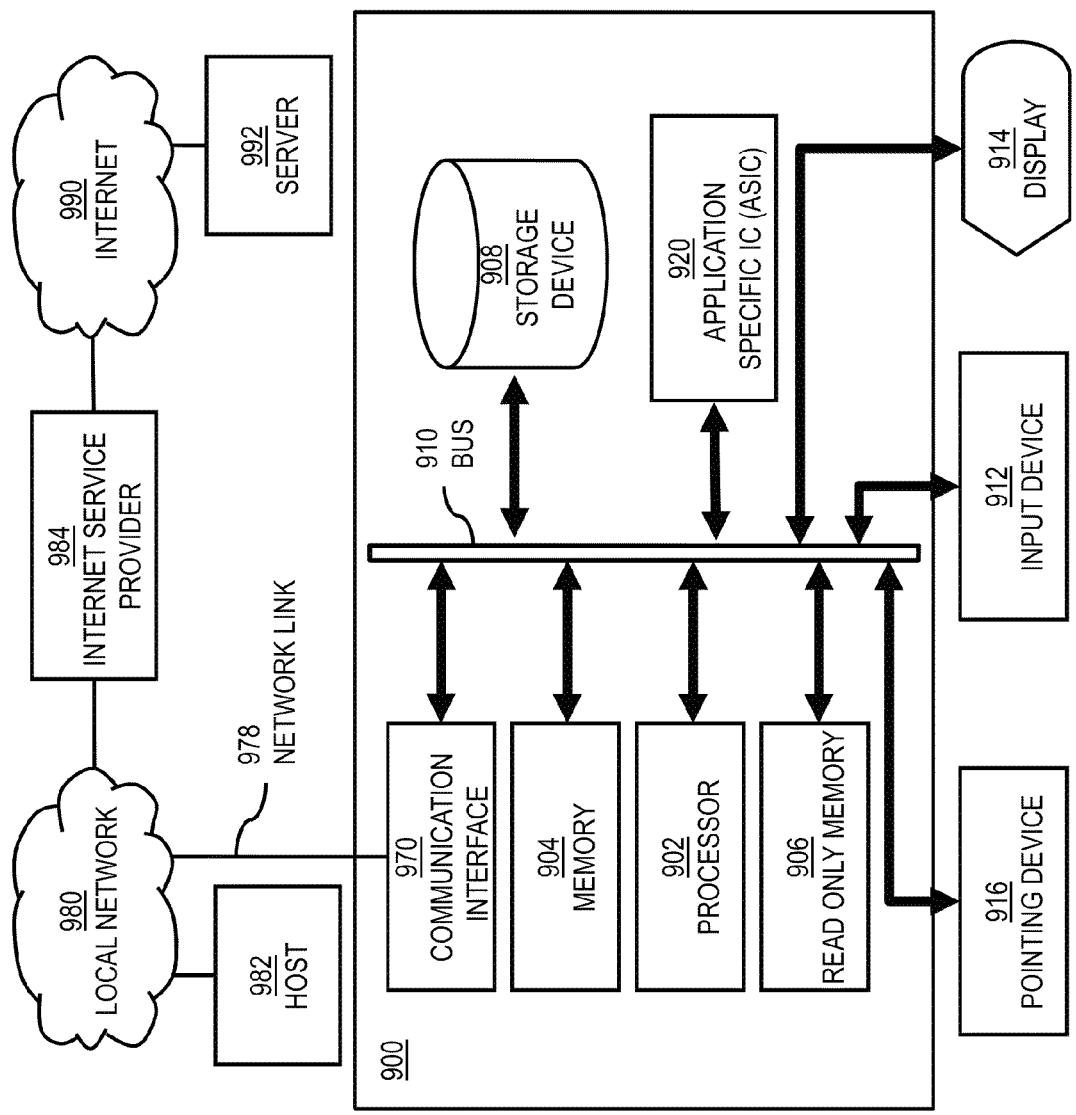
FIG. 9 is a diagram of hardware that can be used to implement an embodiment of the invention.

FIG. 3 is a flowchart of a process for, at least, determining viewpoint of a viewer of at least one content item and rendering of at least one audio object, according to various embodiments. In various embodiments, the processing platform 109, the service providers 105, the content providers 107, and/or the UEs 101 may perform the process 300 and may be implemented in, for instance, a chip set including a processor and a memory as shown in FIG. 9. As such, the processing platform 109, the service providers 105, the content providers 107, and/or the UEs 101 can provide means for accomplishing various parts of the process 300 as well as means for accomplishing other processes in conjunction with other components of the system 100. Throughout this process, the processing platform 109 is referred to as completing various portions of the process 300, however, it is understood that other components of the system 100 can perform some of and/or all of the process steps. Further, in various embodiments, the processing platform 109 may be implemented in one or more entities of the system 100.

In step 301, the processing platform 109 determines a viewpoint of a viewer of at least one content item associated with a geo-location. In one embodiment, the processing platform 109 determines a viewer's/user's perspective (e.g., virtual location, viewing angle, etc.), with reference to a geo-location, when the user is viewing a content item in the application, for example, via data from global positioning system (GPS), compass, gyroscope, and the like associated with a user device. In one use case, a user may utilize a mapping application on a device (e.g., a tablet) to view one or more content items (e.g., images, drawings, map objects, etc.) presented via the mapping application and/or overlaid onto the mapping application (e.g., media items included in a presentation of a map), wherein the content items may be renderings of various 2D, 3D, AR, VR, and the like representations and/or images of objects (e.g., buildings, people, cars, birds, motorcycles, etc.) associated with a given geo-location (e.g., a city center). In various embodiments, the viewpoint may be determined by an application, may be selected by a user, by a service provider, and the like. For example, a user may utilize a user interface (UI) to select a viewpoint in a map which may indicate a virtual geo-location in the map (e.g., the viewer standing at a corner of an intersection at a given city center). In one embodiment, the viewpoint may be determined from current and/or previous location information associated with a user, for example, GPS information in a user device. In one embodiment, the one or more content items may be captured and/or provided by an application, a user, a content provider, a service provider, or a combination thereof, for example, based on location information by the user.

In step 303, the processing platform 109 determines at least one audio object associated with the at least one content item, the geo-location, or a combination thereof. In various embodiments, the processing platform 109 may provide, retrieve, and/or capture one or more audio objects for association with a content item, an object, a geo-location, and the like. In one instance, a service provider may determine, from a content item (e.g., a picture), the geo-location information of a POI (e.g., a certain city park) that is being viewed by a user via an application (e.g., a mapping application) and may provide/cause a retrieval of one or more audio objects associated with the POI and/or the surrounding area within an audible distance. For example, the geo-location of the POI may be associated with audio objects including sounds from a nearby water fountain, a bird sanctuary, pedestrian traffic, and the like. In one embodiment, the user may provide the one or more audio objects (e.g., from a personal recording, from a storage device, etc.)

In step 305, the processing platform 109 processes and/or facilitates a processing of the at least one audio object for rendering one or more elements of the at least one audio object based, at least in part, on the viewpoint. In one embodiment, a processing platform 109 (e.g., via a service provider, a content provider, a user device, etc.) may process the one or more audio objects for determining one or more elements of the one or more audio objects based on the viewpoint of the viewer. In one instance, an audio object may include various elements that may be utilized to render various renditions, for example, in high definition (HD), in stereo, directional, and the like based on the viewer's viewpoint, the audio parameters (e.g., viewer selection, device capability, etc.), the viewer distance to a sound source (e.g., virtual distance in a mapping application), and the like. In one embodiment, the at least one audio object is captured substantially simultaneously, at a same geo-location, or a combination thereof as the at least one content item. In various embodiments, the one or more audio objects may be captured/recorded by a user and/or a service provider at a same time and/or at a same location as the one or more content items. For example, a user and/or a service provider may capture an image (or a video) of a POI at a certain geo-location, wherein one or more audio objects (e.g., sound recordings) may also be captured at the same time and same location. In one embodiment, the one or more audio objects may be captured before and/or after a content item is captured, for example, to provide sound around the time the content item was captured.

In step 307, the processing platform 109 processes and/or facilitates a processing of the at least one audio object for manipulating the one or more elements of the at least one audio object. In one embodiment, the processing platform 109 may process and/or manipulate the one or more audio objects and/or their one or more elements. In one instance, an audio object may have various elements for HD sounds, stereo, music, speech, nature sounds, and the like, wherein various applications, user preferences, device capabilities, and the like may require and/or suggest manipulation of the elements of the audio objects. For example, a user may wish to amplify, fadeout, mix, etc. certain elements of an audio object for different effects, for clarity, different experience, and the like. In one embodiment, one or more audio objects and/or one or more elements of the one or more audio objects may be presented in a loopback mode (e.g., for continues playing).

In step 309, the processing platform 109 processes and/or facilitates a processing of the at least one content item for determining at least one physical object, at least one audio source associated with the at least one audio object, metadata associated with the at least one content item, or a combination thereof. In various embodiments, a processing platform may utilize one or more algorithms, processes, applications, etc. to process one or more content items (e.g., an image, a video segment, etc.) for determining one or more physical objects (e.g., a car, a statue, a person, a dog, a street sign, etc.), one or more potential audio sources (e.g., a dog, a car, a bird, a person, rain, etc.), metadata associated with the one or more content items (e.g., location information, a POI, date, time, etc.), and the like. For example, a content item may include one or more images of one or more objects/things, which may be detected/recognized by utilizing one or more applications (e.g., image detection, face detection, object detection, etc.)

In step 311, the processing platform 109 determines one or more other audio objects based, at least in part, on the at least one physical object, the at least one audio source, the metadata, or a combination thereof. In one embodiment, a processing platform, a content provider, and the like may retrieve, request, and/or provide one or more audio objects which may be associated with the at least one physical object, for example, sounds near a building, in a shopping mall, at a POI, etc. In one embodiment, the one or more audio objects may be associated with one or more audio sources, for example, a car, sirens on an ambulance, a motorcycle, people, birds, pedestrian traffic, etc. Further, the one or more audio objects may be determined from metadata associated with a content item, for example, a given shopping district at a given time of day during a shopping day, a certain seaside café (e.g., sounds of seagulls, boats, waves, music, etc.)

In step 313, the processing platform 109 causes, at least in part, a synthesis of one or more segments of the at least one audio object, the one or more elements, or a combination thereof. In one embodiment, one or more segments of one or more audio object and/or one or more elements may be synthesized (e.g., electronically produced), which may be based on one or more available audio objects and/or elements, one or more audio sources, one or more content items, one or more geo-locations, one or more POIs, and the like. For example, a content item includes an image of a motorcycle speeding through a street with tall buildings, wherein a synthesizer on a device, at a content provider, and the like may synthesize sound of a motorcycle substantially close to possible sounds (e.g., exhaust, engine, wheels, etc.) for the motorcycle recognized in the image (e.g., type, model, etc.) with possible effects/elements due to the pavement, echo from nearby buildings, and the like.

Figure 4:
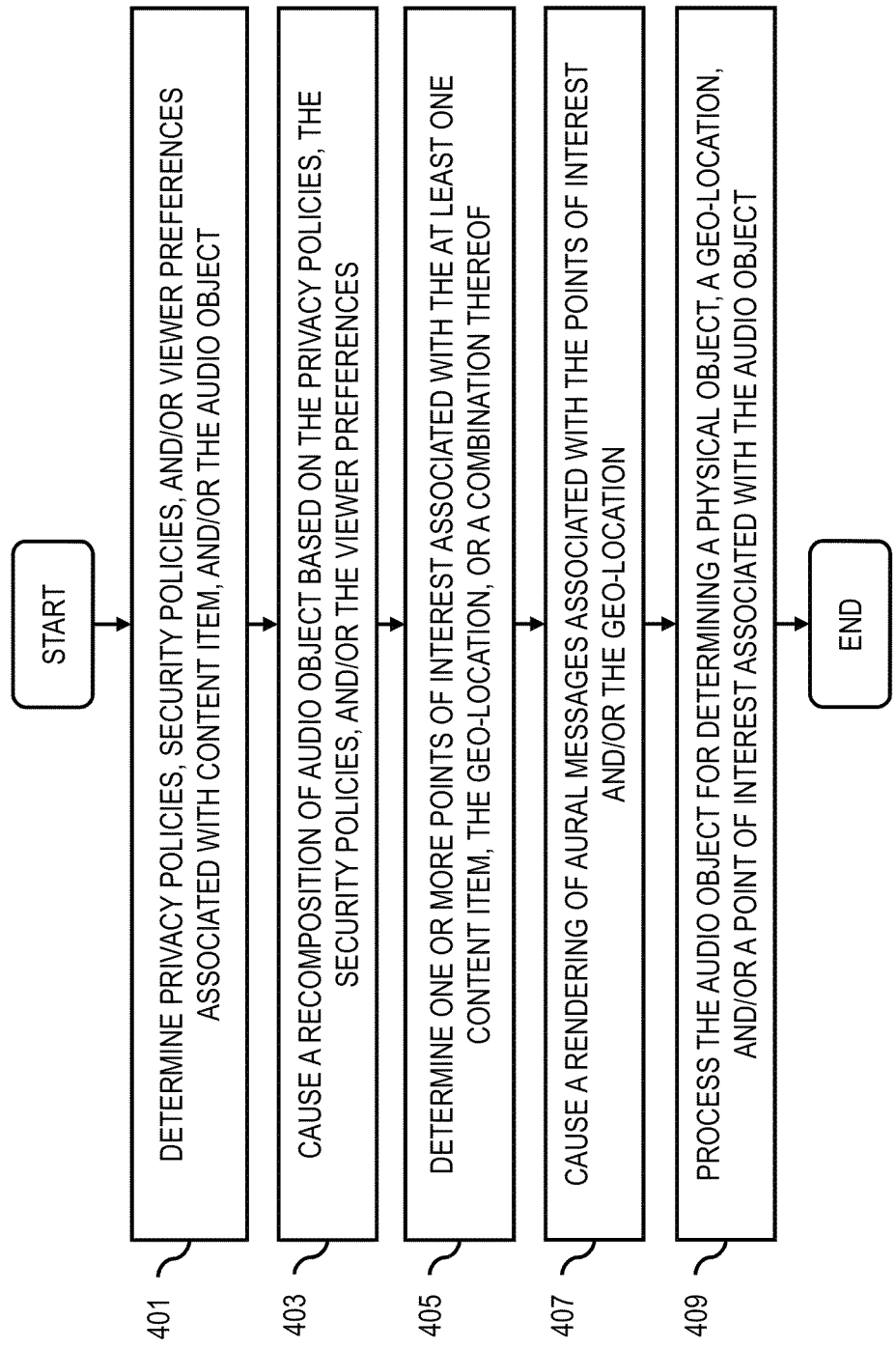

FIG. 4 is a flowchart of a process for, at least, determining privacy and/or security policies associated with at least one audio object and causing a recomposition of the at least one audio object, according to various embodiments. In various embodiments, the processing platform 109, the service providers 105, the content providers 107, and/or the UEs 101 may perform the process 400 and may be implemented in, for instance, a chip set including a processor and a memory as shown in FIG. 9. As such, the processing platform 109, the service providers 105, the content providers 107, and/or the UEs 101 can provide means for accomplishing various parts of the process 400 as well as means for accomplishing other processes in conjunction with other components of the system 100. Throughout this process, the processing platform 109 is referred to as completing various portions of the process 400, however, it is understood that other components of the system 100 can perform some of and/or all of the process steps. Further, in various embodiments, the processing platform 109 may be implemented in one or more entities of the system 100.

In step 401, the processing platform 109 determines one or more privacy policies, one or more security policies, one or more viewer preferences, or a combination thereof associated with the at least one content item, the at least one audio object, or a combination thereof. In various embodiments, the processing platform 109 may determine one or more privacy policies, security policies, user preferences, and the like which may be associated with a content item and/or an audio object. For example, an image may depict a person speaking (e.g., facial expression/gestures, open mouth, etc.) at an audible distance (e.g., 3 feet away, privacy/security consideration). In one example, an image depicts a concert hall, a music store, and the like, where copyright content may be present (e.g., music playing). In one embodiment, a device may include viewer preferences and/or the viewer may utilize a UI to indicate certain preferences associated with a content item and/or an audio object (e.g., associated with the content item). In various embodiments, processing/analysis of one or more elements of one or more audio objects (e.g., audio analysis) may indicate one or more privacy/security policies (e.g., intelligible speech, music, etc.), potential user preferences (e.g., for noisy audio objects, for too many overlapping audio objects/elements, for music, etc.)

In step 403, the processing platform 109 causes, at least in part, a recomposition of the at least one audio object based, at least in part, on the one or more privacy policies, the one or more security policies, the one or more viewer preferences, or a combination thereof. In various embodiments, the processing platform 109, a content provider, and the like, may recompose one or more audio objects and/or one or more elements based on the one or more privacy/security policies, viewer preferences, device capabilities, and the like. For example, an audio object and/or its elements may be recomposed (e.g., altered, manipulated, etc.) so that an intelligible speech becomes substantially un-intelligible (e.g., considering privacy issues), a music recording becomes very short (e.g., considering copyright issues). In one example, one or more audio objects and their elements are recomposed according to viewer preferences; for example, by including, excluding, changing direction, adding special effects, and the like to the one or more audio objects and/or to their elements.

In step 405, the processing platform 109 determines one or more points of interest associated with the at least one content item, the geo-location, or a combination thereof. In one embodiment, one or more POIs (e.g., a shopping mall, a restaurant, a coffee shop, a food mart, a museum, etc.) may be determined, for example, from a content item (e.g., an image of a city center), from geo-location information associated with a content item and/or a user (e.g., device), metadata associated with a content item, and/or an audio object.

In step 407, the processing platform 109 causes, at least in part, a rendering of one or more aural messages associated with the one or more points of interest, the geo-location, or a combination thereof. In one embodiment, the content providers 107, the service providers 105, and the like may present one or more audio objects, which include one or more aural messages (e.g., sales/products/services information, coupons, advertisement, etc.) associated with one or more POIs (e.g., a coffee shop, a shopping mall, a restaurant, etc.) For example, the audio objects may include information based on the location, user preferences, time of day, day of week, and the like.

In step 409, the processing platform 109 processes and/or facilitates a processing of the at least one audio object for determining at least one physical object, at least one geo-location, at least one point of interest, or a combination thereof associated with the at least one audio object. In one embodiment, the processing platform 109 may analyze one or more audio objects and/or their elements for determining a physical object (e.g., a car, an audio source) that may be associated with the one or more audio objects and/or their elements. In one embodiment, the processing platform may also determine one or more geo-locations and/or POIs associated with the one or more audio objects and/or their elements. For example, one or more audio objects may be associated with a certain shopping mall (e.g., indoor, outdoor), wherein the audio objects may be associated with different times of a day, days of a week, at a particular distance from an audio source, and/or may be various audio objects collected by various users and/or content/service providers. In one instance, multiple users may have collected audio objects (e.g., sound recordings), which may be aggregated by one or more content/service providers. In one example, an audio object may be associated with a particular POI at a particular geo-location (e.g., Eiffel Tower, Paris), or a particular POI (e.g., a seaside marina) available at various geo-locations, and the like.

Figure 5:
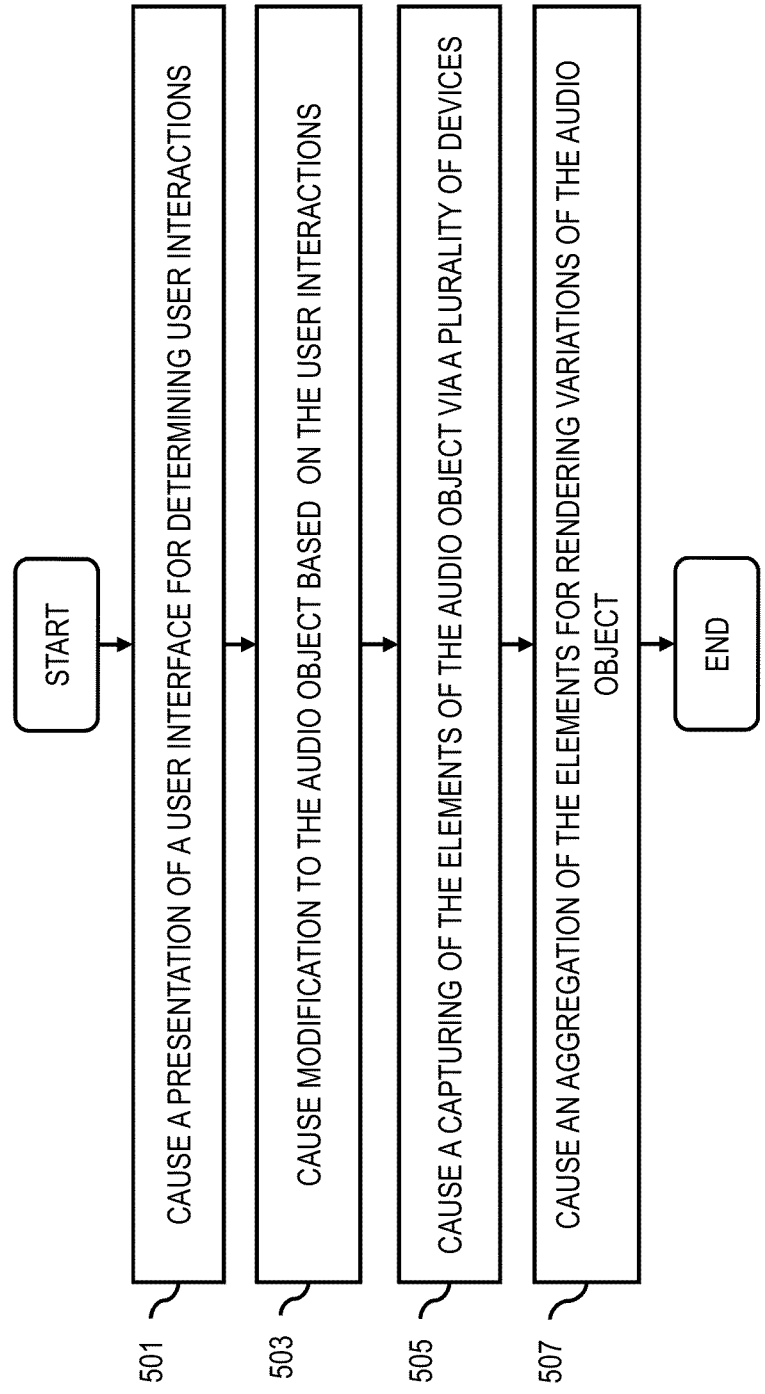

FIG. 5 is a flowchart of a process for, at least, determining user interaction for causing one or more modifications to the at least one audio object, according to various embodiments. In various embodiments, the processing platform 109, the service providers 105, the content providers 107, and/or the UEs 101 may perform the process 500 and may be implemented in, for instance, a chip set including a processor and a memory as shown in FIG. 9. As such, the processing platform 109, the service providers 105, the content providers 107, and/or the UEs 101 can provide means for accomplishing various parts of the process 500 as well as means for accomplishing other processes in conjunction with other components of the system 100. Throughout this process, the processing platform 109 is referred to as completing various portions of the process 500, however, it is understood that other components of the system 100 can perform some of and/or all of the process steps. Further, in various embodiments, the processing platform 109 may be implemented in one or more entities of the system 100.

In step 501, the processing platform 109 causes, at least in part, a presentation of a user interface for determining one or more user interactions. In various embodiments, a UI application with various elements may be presented to a user/viewer whereby the user may indicate various user preferences, for example, in viewing content items and/or in consuming one or more audio objects and their elements.

In step 503, the processing platform 109 causes, at least in part, at least one modification to the at least one audio object based, at least in part, on the one or more user interactions. In one various embodiments, a user may select different vantage points (e.g., different angles, different positions) for viewing various content items in a map view and/or for hearing various associated audio objects and their elements under different conditions (e.g., daytime, night time, rush hour, lunch time, weekends, etc.) and/or with certain effects (e.g., stereo, loop, fadeout, aural messages, etc.)

In step 505, the processing platform 109 cause, at least in part, a capturing of the one or more elements of the at least one audio object via a plurality of devices. In various embodiments, one or more devices (e.g., capable of recording audio, multimedia, etc.) may be utilized for capturing one or more audio objects and/or one or more elements of one or more audio objects. For example, a user and/or a service provider may utilize one or more devices with one or more microphones (e.g., directional, at different orientations, with different sensitivities, etc.) for recording various sound recordings, wherein each device and/or element may record various audio objects and/or elements. In one embodiment, a plurality of microphones may be on one device (e.g., with spatial separation), for example, a mobile phone, a car, a camera, etc.

In step 507, the processing platform 109 cause, at least in part, an aggregation of the one or more elements for rendering one or more variations of the at least one audio object. In various embodiments, a plurality of audio objects and/or elements may be aggregated and rendered as one or more audio objects and/or one or more elements of one or more audio objects, wherein the aggregation may be performed by a user device, by a content/service provider, and the like. In one embodiment, one or more elements of one or more audio objects may be aggregated to render one or more different audio objects than originally intended for.

Figure 6A:
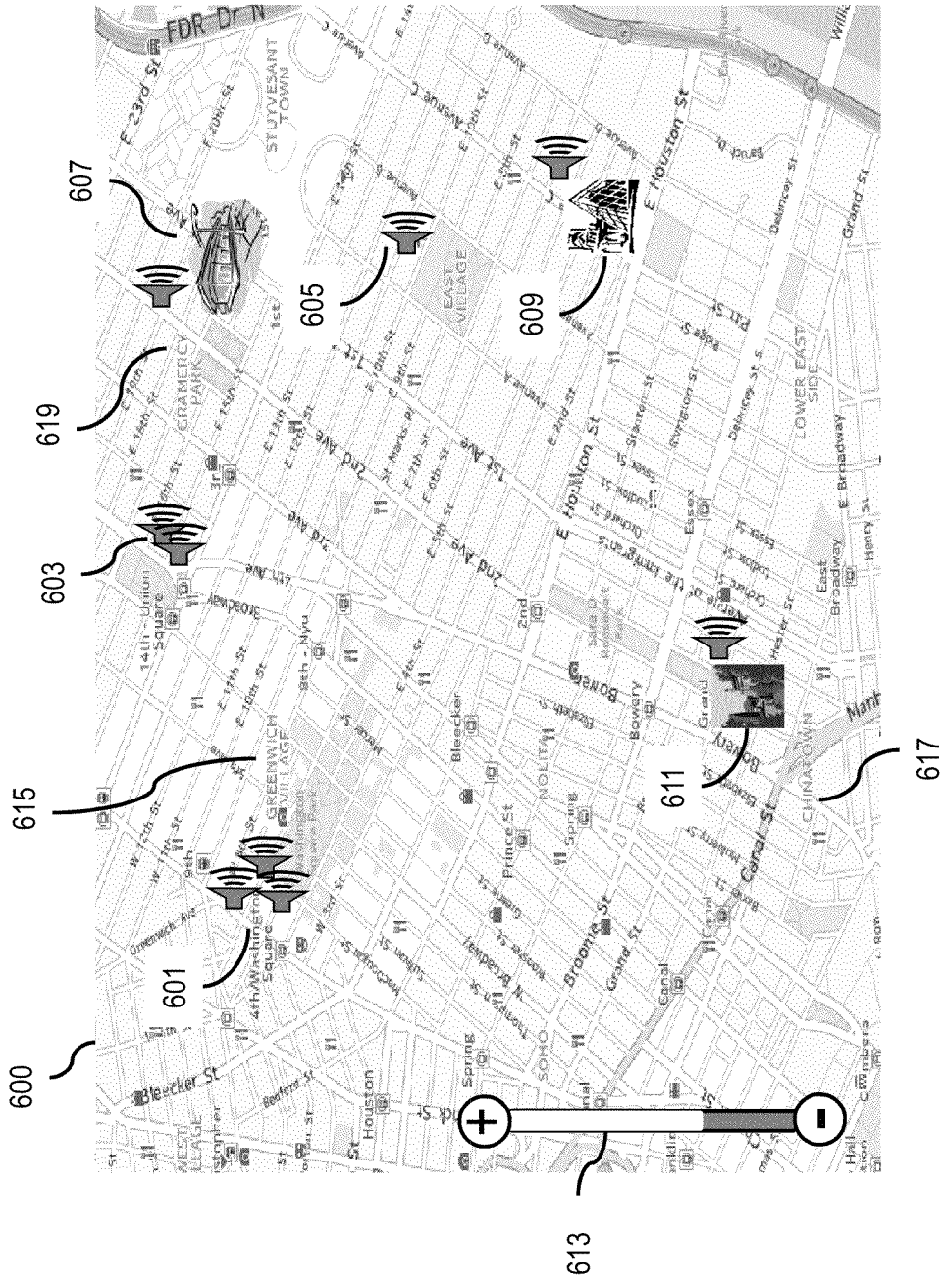
FIGS. 6A and 6B illustrate mapping applications including content item indicators at various geo-locations, according to an embodiment.
Figure 6B:
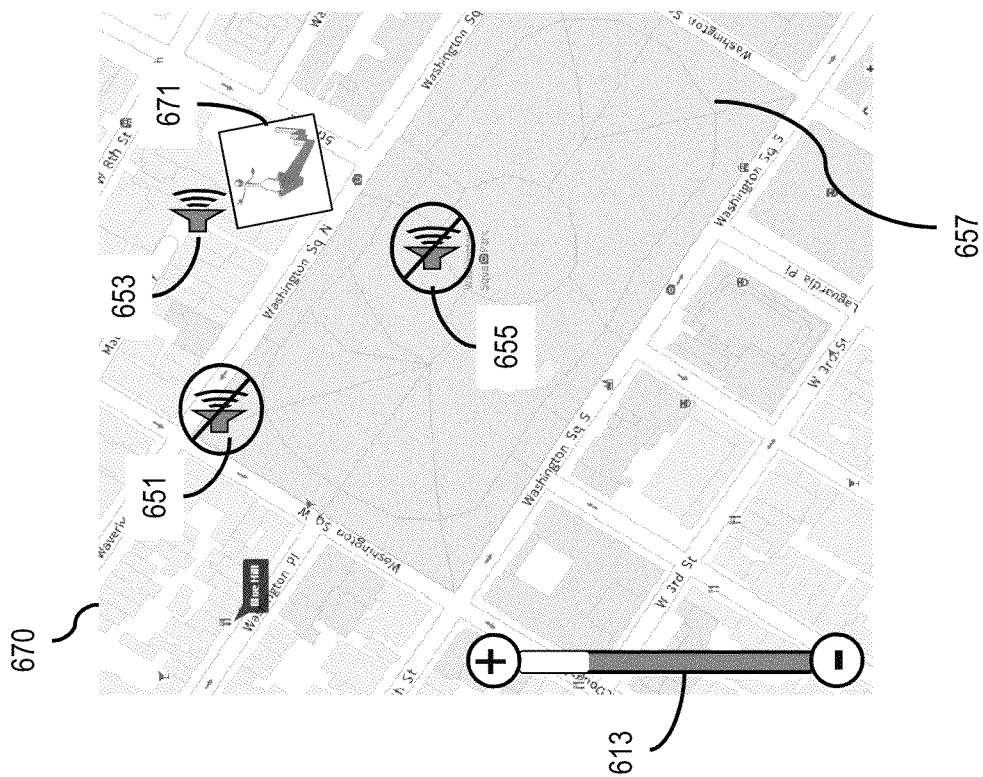
Figure 6B:
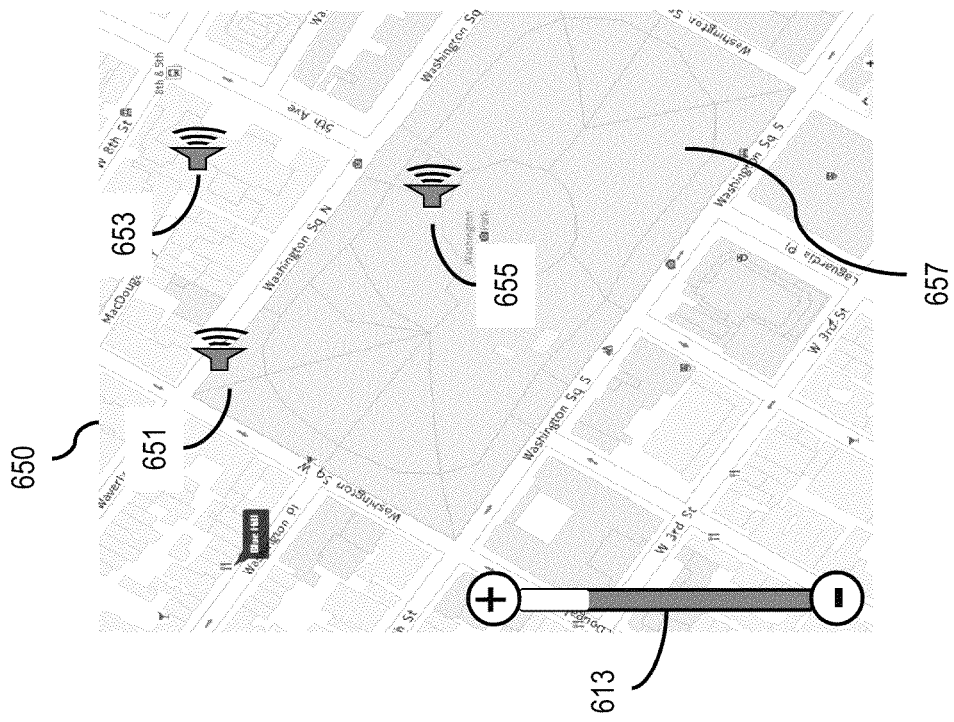

FIGS. 6A and 6B illustrate mapping applications including content item indicators at various geo-locations, according to an embodiment.

FIG. 6A depicts UIs 600 including a map of a geo-location area presented on a device (e.g., a mobile phone), where the geo-location may be indicated by a user, by an application, by a content item (e.g., location information in metadata), and the like. For example, a user may wish to utilize a mapping application to explore areas near Greenwich Village in New York City (Greenwich) and experience virtual sights and sounds associated with the area. In one embodiment, various POIs close to the Greenwich area may be determined from one or more service providers and various content items (e.g., images, videos, audio objects, etc.) may be requested from the one or more service providers and/or one or more content providers. In one embodiment, a plurality of audio objects 601, 603, and 605 are available near the Greenwich area. In one embodiment, a plurality of images and associated audio objects 607, 609, and 611 are presented at various geo-locations near the Greenwich area. In one embodiment, a user and/or one or more applications may determine the viewable area via a zoom option 613. In one embodiment, the content items (e.g., images, audio objects, etc.) may be requested and/or determined by indicating geo-location information, for example, Manhattan, N.Y. (e.g., address, GPS information, etc.), by POI information, for example, 1) name—Greenwich Village 615, China Town 617, 2) type of the POI—a park near East Village 617, a certain restaurant 607 near Gramercy Park 619, and the like. In one embodiment, depending on viewing granularity (e.g., zoom level) of contents in an application (e.g., map), content items may be shown as substantially close, for example 601, and/or may be shown as staggered. In various embodiments, the content items and/or the mapping application may be presented in 2D, 3D, AR, VR, and the like representations.

FIG. 6B shows UI 650 and 670. In UI 650, a user and/or the applications 103 may have adjusted the zoom level at 613, whereby a more detailed view of the area is shown and where the audio objects of 601 in the FIG. 6A are shown as distinct audio objects 651, 653, and 655, (e.g., are shown as farther apart). For example, the audio objects 651 and 653 are shown as being outside of the Washington Park 657, whereas 655 is at a location inside the park. Further, in the UI 670, a user may indicate, for example via a UI, a desired viewpoint location 671 in the map application so that the user may consume (e.g., view, listen to, etc.) content items (e.g., images, audio objects, video, etc.) from that perspective, which may indicate a distance, an angle, an elevation, and the like with respect to one or more content items and/or geo-locations. In one embodiment, a user may select a particular audio object 655 for consumption. In various embodiments, the applications 103, the processing platform 109, and the like may determine that audio object 653 is an optimum choice based on user viewpoint, user preferences, user device capabilities, POI, and the like, while the other audio objects 651 and 655 may not be active.

Figure 7:
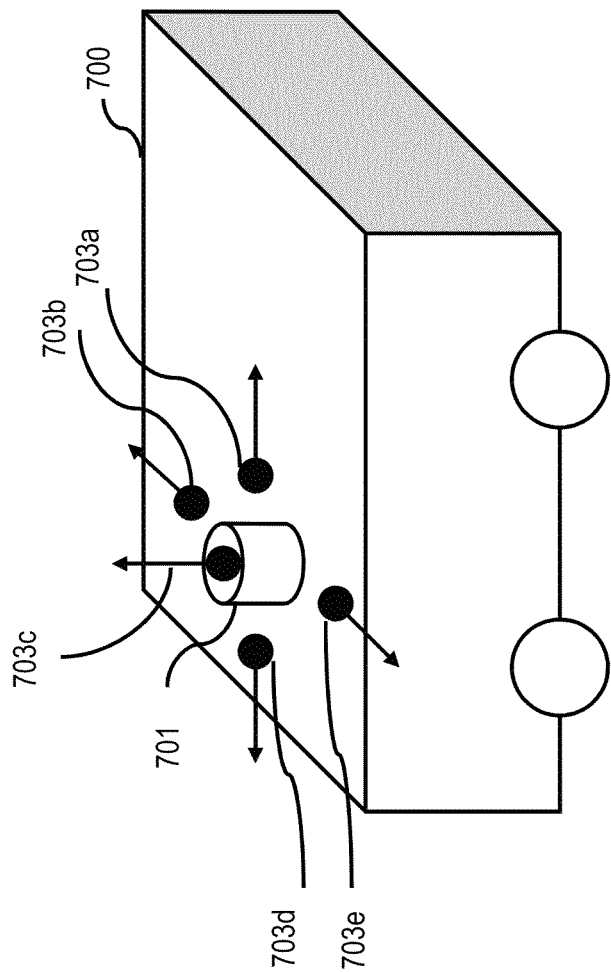
FIG. 7 depicts a mechanism for collecting content items, according to various embodiments.

FIG. 7 depicts a mechanism for collecting content items, according to various embodiments. In one embodiment, a content collection system 700 may be associated (e.g., mounted) with a collection vehicle (e.g., automobile, cart, mounting support, etc.), wherein collection device 701 may be capable of collecting content item samples/elements (e.g., audio, image, video, etc.) via one or more sensors 703*a*-703*n*. In one embodiment, the one or more sensors include audio sensors 703*a*-703*e*, which may be directional microphones for collection one or more elements of and/or one or more audio objects, wherein the metadata (e.g., geo-location, time information, orientation, acceleration, gyroscopic, etc.) associated with the system 700, with the one or more audio objects, and/or the one or more elements may be collected and/or included with the collected samples. In one embodiment, one or more elements collected via the 703*a*-703*e* sensors (e.g., cameras, microphones, etc.) may be aggregated to render one or more various audio objects, for example, according to one or more user preferences, content providers, service providers, audio sources, and the like. In one embodiment, the content items may be collected for rendering a 360-degree aggregated spatial representation of a geo-location and associated contents.

FIGS. 8A through 8D illustrate various configurations for rendering various content items in a 360 degree viewing configuration, according to various embodiments.

In FIG. 8A, shows a configuration of audio objects 801*a*-801*e* corresponding to the audio objects and/or elements 703*a*-703*e* in FIG. 7. In one embodiment, the processing platform 109 and/or a UE 101 may determine viewing direction 803 based on, for example, user/viewer location and directional information (e.g., GPS, gyroscope, compass, etc.) along a path 805 that may be 360 degrees and/or panoramic with reference to a viewer's position (viewing position), an audio object's position, etc., wherein the viewing direction may be among the one or more audio objects, for example, 801*a*-801*e*. In one example, the user viewing direction 803 is sufficiently in the direction of audio object 801*a* so that active audio object is selected to be 801*a*.

Figure 8B:
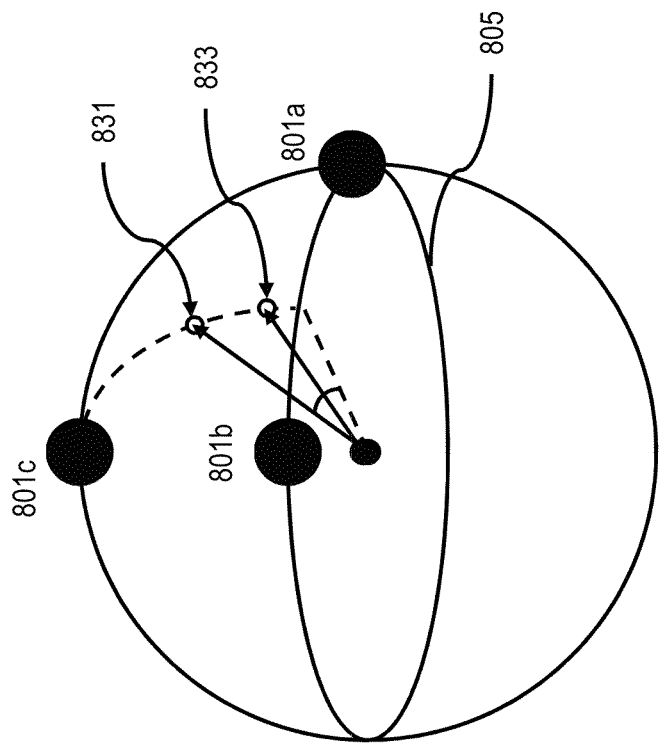

FIG. 8B shows configuration 830 wherein the viewer direction is in indicated by 831, which is sufficiently among the audio objects 801*a*, 801*b*, and 801*c*, wherein the processing platform 109 and/or the UE 101 may cause a rendering of the audio objects 801*a*, 801*b*, and 801*c* according to with substantially equal audio quality parameters (e.g., volume, tone, echo, etc.). In one embodiment, the viewing direction may be at a different point as indicated by 833, wherein the audio objects 801*a*, 801*b*, and 801*c* may be given different preferences in, for example, 801*a*=40%, 801*b*=40%, and 801*c*=20%, in aural volume so that the user/viewer may have a sense of the audio rendering substantially similar as if he was at the actual physical geo-location with the same viewing perspective and distance to objects and sound sources.

Figure 8C:
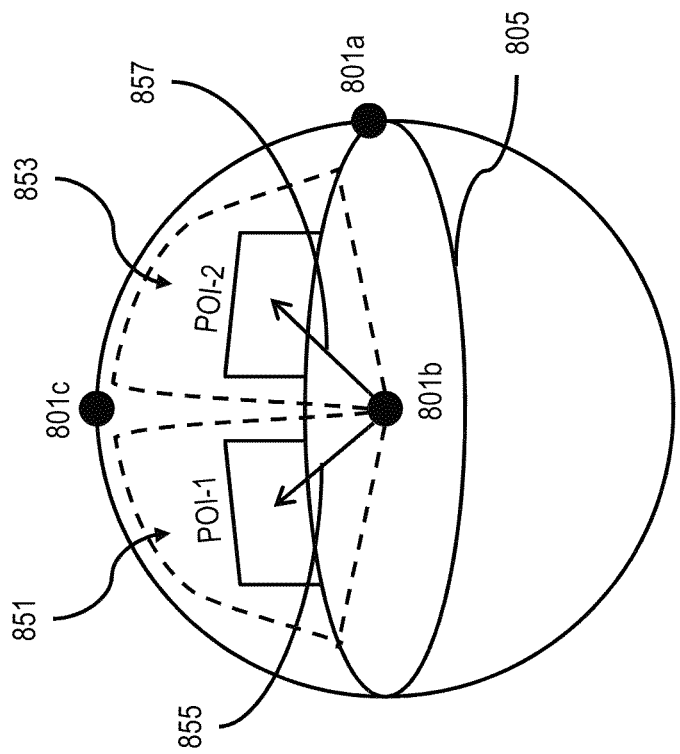

FIG. 8C illustrates configuration 850 where various content items may be consumed by a user. In one embodiment, a mapping application may present content items 851 associated with POI-1 and 851 with POI-2. In one embodiment, when the user viewing direction is at 855, then one or more audio objects including aural messages associated with the POI-1 may be presented to the user, for example, information about advertisements, services, coupons, products, and the like that may be available at POI-1. Similarly, when the viewing direction is at 857, one or more aural messages associated with the POI-2 may be presented. In one embodiment, the audio objects associated with POI-1 and POI-2 may be combined with audio objects associated with the geo-location of the POI-1 and POI-2.

Figure 8D:
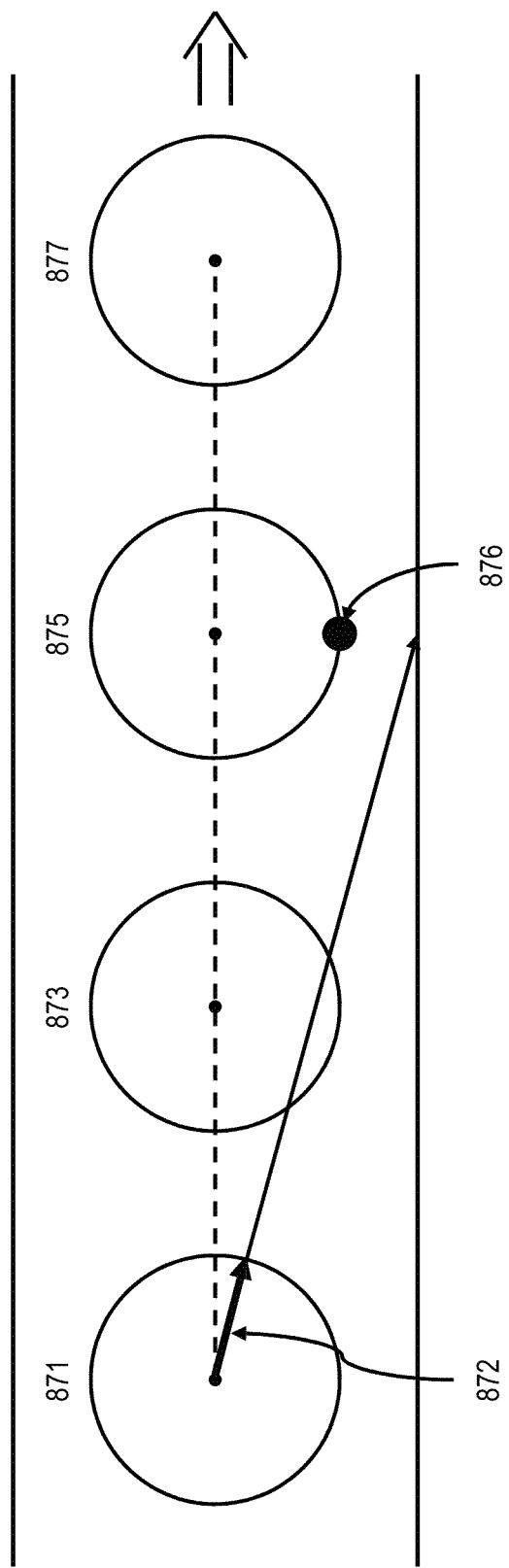

FIG. 8D illustrates various 360-degree views of the nearby geo-locations, wherein a user may view content items in a given direction whereby other nearby content items may be presented to the user based on selected viewing granularity/zoom level. In one embodiment, a user may be viewing content items in geo-locations 871, 873, 875, and 877 with viewing direction 872, wherein the user may utilize a zoom option (e.g., similar to 613 in FIG. 6A) to focus on a certain POI associated with the geo-location 871. Further, the processing platform 109 and/or applications 103 may determine one or more other audio objects and/or elements 876 associated with geo-location 875. For example, an audio object from another geo-location, which may be in direction of the viewing line 872, may be rendered.

The processes described herein for efficiently capturing, processing, presenting, and/or associating audio objects with content items and geo-locations may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 910 can deploy the illustrated hardware and components of system 900. Computer system 900 is programmed (e.g., via computer program code or instructions) to efficiently capturing, processing, presenting, and/or associating audio objects with content items and geo-locations as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of efficiently capturing, processing, presenting, and/or associating audio objects with content items and geo-locations.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to efficiently capture, process, present and/or associate audio objects with content items and geo-locations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for efficiently capturing, processing, presenting, and/or associating audio objects with content items and geo-locations. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for efficiently capturing, processing, presenting, and/or associating audio objects with content items and geo-locations, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914, and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners, and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic, or electromagnetic signals, including infrared and optical signals that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 113 for efficiently capturing, processing, presenting, and/or associating audio objects with content items and geo-locations.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980, and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
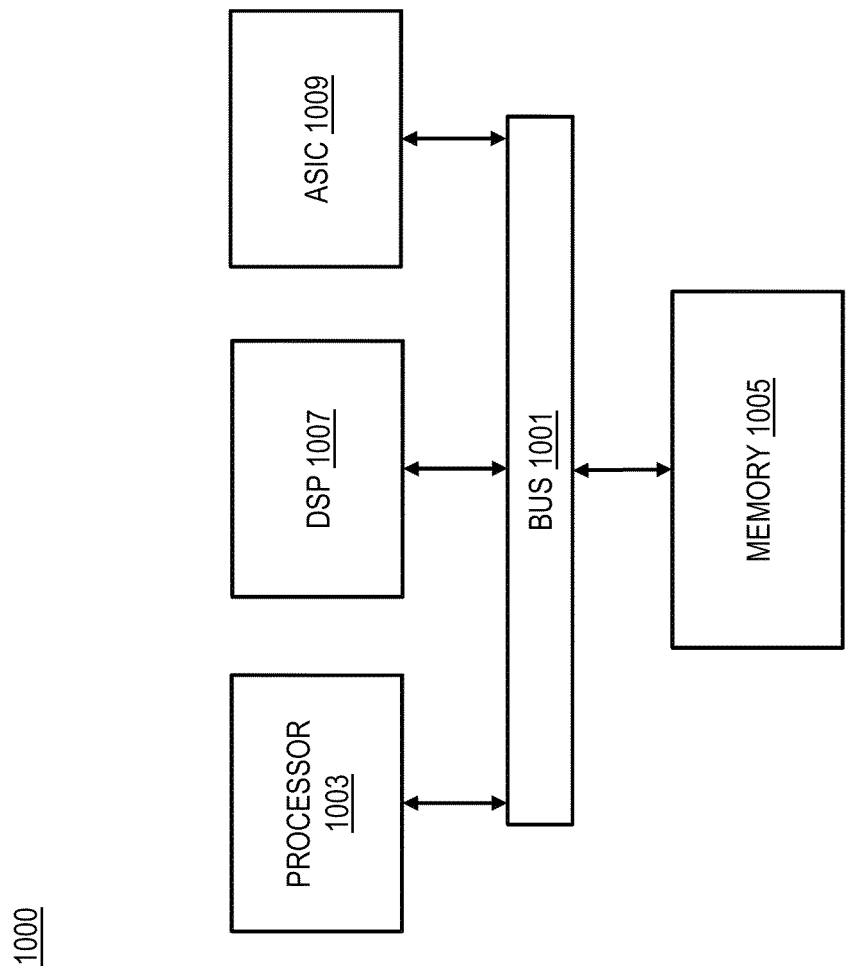
FIG. 10 is a diagram of a chip set that can be used to implement an embodiment of the invention.

FIG. 10 illustrates a chip set or chip 1000 upon which an embodiment of the invention may be implemented. Chip set 1000 is programmed to efficiently capture, process, present and/or associate audio objects with content items and geo-locations as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of efficiently capturing, processing, presenting, and/or associating audio objects with content items and geo-locations.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to efficiently capturing, processing, presenting and/or associating audio objects with content items and geo-locations. The memory 1005 also stores the data associated with or generated by the execution of the inventive steps.

Figure 11:
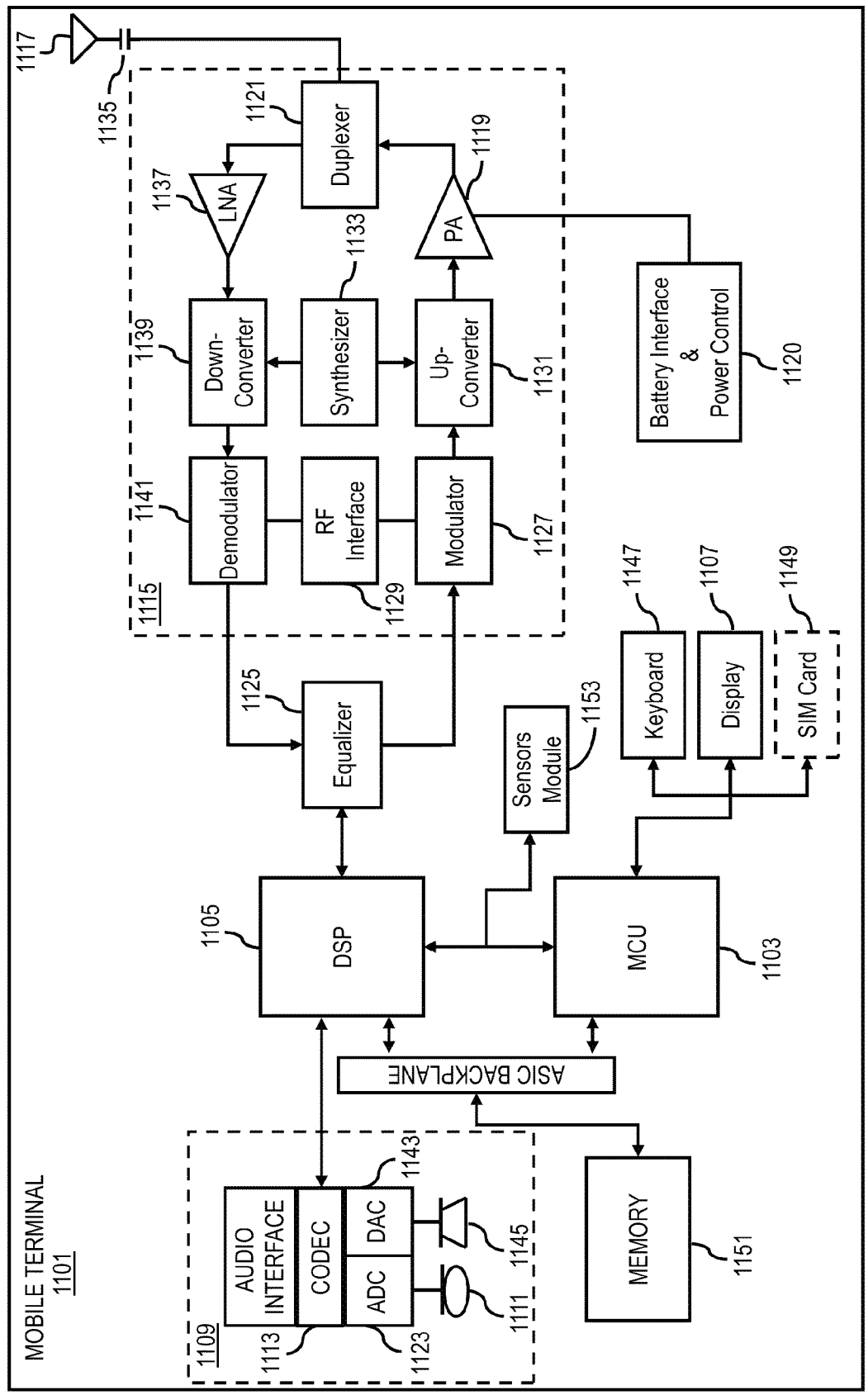
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of efficiently capturing, processing, presenting, and/or associating audio objects with content items and geo-locations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of efficiently capturing, processing, presenting, and/or associating audio objects with content items and geo-locations. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 for efficiently capturing, processing, presenting, and/or associating audio objects with content items and geo-locations. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    at least one determination of a viewpoint of a viewer of at least one content item associated with a geo-location, the viewpoint representative of the viewer viewing the content item at the geo-location;
    at least one determination of at least one audio object associated with the at least one content item, the geo-location, or a combination thereof; and
    a processing of the at least one audio object for rendering one or more elements of the at least one audio object including representative spatial sound effects based, at least in part, on the viewpoint.

2. A method of claim 1, wherein the at least one audio object is captured substantially simultaneously, at a same geo-location, or a combination thereof as the at least one content item.

3. A method of claim 1, wherein the (1) data and/or (2) information and/or (3) at least one signal are further based, at least in part, on the following:
    a processing of the at least one audio object for manipulating the one or more elements of the at least one audio object.

4. A method of claim 1, wherein the (1) data and/or (2) information and/or (3) at least one signal are further based, at least in part, on the following:

a processing of the at least one content item for determining at least one physical object, at least one audio source associated with the at least one audio object, metadata associated with the at least one content item, or a combination thereof; and at least one determination of one or more other audio objects based, at least in part, on the at least one physical object, the at least one audio source, the metadata, or a combination thereof.

5. A method of claim 1, wherein the (1) data and/or (2) information and/or (3) at least one signal are further based, at least in part, on the following:

causing, at least in part, a synthesis of one or more segments of the at least one audio object, the one or more elements, or a combination thereof.

6. A method of claim 1, wherein the (1) data and/or (2) information and/or (3) at least one signal are further based, at least in part, on the following:

at least one determination of one or more privacy policies, one or more security policies, one or more viewer preferences, or a combination thereof associated with the at least one content item, the at least one audio object, or a combination thereof; and a recomposition of the at least one audio object based, at least in part, on the one or more privacy policies, the one or more security policies, the one or more viewer preferences, or a combination thereof.

7. A method of claim 1, wherein the (1) data and/or (2) information and/or (3) at least one signal are further based, at least in part, on the following:

at least one determination of one or more points of interest associated with the at least one content item, the geo-location, or a combination thereof; and a rendering of one or more aural messages associated with the one or more points of interest, the geo-location, or a combination thereof.

8. A method of claim 1, wherein the (1) data and/or (2) information and/or (3) at least one signal are further based, at least in part, on the following:

a processing of the at least one audio object for determining at least one physical object, at least one geo-location, at least one point of interest, or a combination thereof associated with the at least one audio object.

9. A method of claim 1, wherein the (1) data and/or (2) information and/or (3) at least one signal are further based, at least in part, on the following:

a presentation of a user interface for determining one or more user interactions; and at least one modification to the at least one audio object based, at least in part, on the one or more user interactions.

10. A method of claim 1, wherein the (1) data and/or (2) information and/or (3) at least one signal are further based, at least in part, on the following:

a capturing of the one or more elements of the at least one audio object via a plurality of devices; and an aggregation of the one or more elements for rendering one or more variations of the at least one audio object.

11. An apparatus comprising:

at least one processor; and at least one memory including computer program code for one or more programs, the at least one memory and the computer program code configured to, with the at least one processor, cause the apparatus to perform at least the following, determine a viewpoint of a viewer of at least one content item associated with a geo-location, the viewpoint representative of the viewer viewing the content item at the geo-location;

determine at least one audio object associated with the at least one content item, the geo-location, or a combination thereof; and process and/or facilitate a processing of the at least one audio object for rendering one or more elements of the at least one audio object including representative spatial sound effects based, at least in part, on the viewpoint.

12. An apparatus of claim 11, wherein the at least one audio object is captured substantially simultaneously, at a same geo-location, or a combination thereof as the at least one content item.

13. An apparatus of claim 11, wherein the apparatus is further caused to:

process and/or facilitate a processing of the at least one audio object for manipulating the one or more elements of the at least one audio object.

14. An apparatus of claim 11, wherein the apparatus is further caused to:

process and/or facilitate a processing of the at least one content item for determining at least one physical object, at least one audio source associated with the at least one audio object, metadata associated with the at least one content item, or a combination thereof; and determine one or more other audio objects based, at least in part, on the at least one physical object, the at least one audio source, the metadata, or a combination thereof.

15. An apparatus of claim 11, wherein the apparatus is further caused to:

cause, at least in part, a synthesis of one or more segments of the at least one audio object, the one or more elements, or a combination thereof.

16. An apparatus of claim 11, wherein the apparatus is further caused to:

determine one or more privacy policies, one or more security policies, one or more viewer preferences, or a combination thereof associated with the at least one content item, the at least one audio object, or a combination thereof; and cause, at least in part, a recomposition of the at least one audio object based, at least in part, on the one or more privacy policies, the one or more security policies, the one or more viewer preferences, or a combination thereof.

17. An apparatus of claim 11, wherein the apparatus is further caused to:

determine one or more points of interest associated with the at least one content item, the geo-location, or a combination thereof; and cause, at least in part, a rendering of one or more aural messages associated with the one or more points of interest, the geo-location, or a combination thereof.

18. An apparatus of claim 11, wherein the apparatus is further caused to:

process and/or facilitate a processing of the at least one audio object for determining at least one physical object, at least one geo-location, at least one point of interest, or a combination thereof associated with the at least one audio object.

19. An apparatus of claim 11, wherein the apparatus is further caused to:

cause, at least in part, a presentation of a user interface for determining one or more user interactions; and cause, at least in part, at least one modification to the at least one audio object based, at least in part, on the one or more user interactions.

20. An apparatus of claim 11, wherein the apparatus is further caused to:

cause, at least in part, a capturing of the one or more elements of the at least one audio object via a plurality of devices; and cause, at least in part, an aggregation of the one or more elements for rendering one or more variations of the at least one audio object.

* * * * *